(12) United States Patent
LaBosco

(10) Patent No.: US 11,070,913 B2
(45) Date of Patent: *Jul. 20, 2021

(54) MILLIMETER WAVE SENSOR USED TO OPTIMIZE PERFORMANCE OF A BEAMFORMING MICROPHONE ARRAY

(71) Applicant: Crestron Electronics, Inc., Rockleigh, NJ (US)

(72) Inventor: Mark LaBosco, New City, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,004

(22) Filed: Feb. 26, 2020

(65) Prior Publication Data
US 2020/0275202 A1 Aug. 27, 2020

Related U.S. Application Data

(60) Provisional application No. 62/811,007, filed on Feb. 27, 2019.

(51) Int. Cl.
*H04R 3/00* (2006.01)
*G10L 21/02* (2013.01)
(Continued)

(52) U.S. Cl.
CPC .............. *H04R 3/005* (2013.01); *G06F 3/017* (2013.01); *G10L 21/02* (2013.01);
(Continued)

(58) Field of Classification Search
CPC .... H04R 3/005; H04R 1/406; H04R 2430/20; H04R 2430/23; H04R 2201/401;
(Continued)

(56) References Cited

U.S. PATENT DOCUMENTS 7,359,504 B1 * 4/2008 Reuss ................... H04M 9/082
   379/406.01
9,031,257 B2 * 5/2015 Sorensen ............... H04R 3/005
   381/92
(Continued)

OTHER PUBLICATIONS

"Bringing Intelligent Autonomy to Fine Motion Detection and People Counting with TI mmWave Sensors," Garcia, Keegan, Marketing Manager, Industrial Radar Systems, Texas Instruments, Dec. 2018.

*Primary Examiner* — Norman Yu
(74) *Attorney, Agent, or Firm* — Crestron Electronics, Inc.

(57) ABSTRACT

A beamforming microphone array is described herein, comprising: a plurality of microphones each of which is adapted to receive an acoustic audio signal and convert the same to a microphone (mic) audio signal; a wave sensor system adapted to determine locations of one or more people within a predetermined area about the beamforming microphone array and output the same as user location data signal; and an adaptive beamforming circuit adapted to receive the user location data signal and plurality of mic audio signals and perform adaptive beamforming on the plurality of mic audio signals that takes into account the received user location data signal to adapt a plurality of beam signals, one for each of the microphones, to acquire sound from one or more specific locations in the predetermined area; and a plurality of acoustic echo cancellation devices, one for each of the beam signal outputs from the adaptive beamforming circuit, wherein each of the plurality of acoustic echo cancellation devices is adapted to receive a respective beam signal from the adaptive beamforming circuit and perform acoustic echo cancellation on the received respective beam signal and output the echo-corrected beam signal.

33 Claims, 8 Drawing Sheets

(51) Int. Cl.
*H04R 1/40* (2006.01)
*H04R 29/00* (2006.01)
*G06F 3/01* (2006.01)
*G10L 21/0232* (2013.01)
*G10L 21/0208* (2013.01)

(52) U.S. Cl.
CPC .......... *G10L 21/0232* (2013.01); *H04R 1/406* (2013.01); *H04R 29/007* (2013.01); *G10L 2021/02082* (2013.01); *H04R 2201/403* (2013.01); *H04R 2203/12* (2013.01)

(58) Field of Classification Search
CPC ............ H04R 2201/403; H04R 29/005; H04R 2430/21; H04R 29/004; H04R 29/007; H04R 2201/40; H04R 2203/12; H04R 25/405; G10L 2021/02166; G10L 2021/02082; G10L 21/0232; H04M 9/082

USPC ............ 381/92, 66, 122, 94.1, 56, 317, 356; 379/406.01–406.05; 455/570
See application file for complete search history.

(56) References Cited

U.S. PATENT DOCUMENTS

| | | | |
|---|---|---|---|
| 9,516,409 B1* | 12/2016 | Ramprashad | H04R 1/406 |
| 9,595,997 B1* | 3/2017 | Yang | G10L 21/0208 |
| 9,652,031 B1* | 5/2017 | Savastinuk | G06F 3/011 |
| 9,653,060 B1* | 5/2017 | Hilmes | H04M 9/082 |
| 9,928,847 B1* | 3/2018 | Cleve | H04R 1/406 |
| 2012/0158203 A1* | 6/2012 | Feldstein | G06F 1/3231 |
| | | | 700/295 |
| 2016/0275961 A1* | 9/2016 | Yu | G10L 21/0208 |
| 2017/0195815 A1* | 7/2017 | Christoph | H04S 7/303 |

\* cited by examiner

MILLIMETER WAVE SENSOR USED TO OPTIMIZE PERFORMANCE OF A BEAMFORMING MICROPHONE ARRAY

PRIORITY INFORMATION

The present application claims priority under 35 U.S.C. § 119(e) to U.S. Provisional Patent Application Ser. No. 62/811,007, filed on Feb. 27, 2019, the entire contents of which are expressly incorporated herein by reference.

CROSS REFERENCE TO RELATED APPLICATIONS

Related subject matter is disclosed in the following co-pending U.S. Non-provisional patent applications: Client Matter No. CP00503-01, Ser. No. 16/801,964, filed Feb. 26, 2020; Client Matter No. CP00503-03, Ser. No. 16/802,040, filed Feb. 26, 2020; and Client Matter No. CP00503-04, Ser. No. 16/802,111, filed Feb. 26, 2020, the entire contents of all of which are expressly incorporated herein by reference.

BACKGROUND

Technical Field

Aspects of the embodiments relate to audio systems, and more specifically to systems, methods, and modes for implementing a millimeter wave sensor to optimize operation of a beamforming microphone array, as well as for use in other home or enterprise systems.

Background Art

Microphone (mic) arrays can be used in currently available audio-conferencing systems instead of a single mic located on a conference room table. Such mic arrays typically have two or more mics, and they also typically employ beamforming techniques to increase their ability to pick up and isolate the voices of the people participating in the audio conference. There are primarily two types of ceiling mic arrays currently being used for audio (and video) conferencing systems, each of which exhibits significant drawbacks. The first type is referred to as a fixed beam type, wherein during installation beams are manually positioned over the locations that people will likely sit. A computer is required for this setup. This type of mic array can have multiple outputs (one for each beam) or a single output from a built-in mixer. The beams have to be configured to be large enough to cover spaces where people are likely to be located during an audio conference. Large beam coverage positions, however, have lower S/N performance, especially for positions that are located at a significant distance from the mic array. If one or more people move during the conference call and move in and out of "their" beam position, dropouts in the audio can occur—meaning their voices are less likely to be heard or become less clear.

The other type of mic array is a dynamic beamformer. The dynamic beamformer type of ceiling mic array uses one or more algorithms to locate the position of someone talking and adapts the beam to that location. However, such systems are susceptible to "false positives," meaning that a dynamic beamformer cannot distinguish between a conversation meant for the audio conference that is occurring, and the conversation that might be happening in the hallway just outside the door to the conference room. Also, other sources of noise can cause the dynamic beams to focus on them. Such sources of noise can include the speakers that reproduce the far end audio ringers on cellular devices, fan noises, air conditioning or heating noises, among others. Sophisticated and therefore expensive software and/or additional manual setup can diminish but not eliminate such problems.

Thus, currently available beamforming microphone arrays have limitations such as non-optimized beam forming parameters. Beam position and area of coverage will be non-optimal. Adaptive beamformers cannot distinguish voice from people vs. audio speakers. As those of skill in the art can therefore appreciate, both of the primary currently available devices therefore exhibit significant drawbacks.

Accordingly, a need has arisen for systems, methods, and modes for systems, methods, and modes for implementing a millimeter wave sensor to optimize operation of a beamforming microphone array.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for systems, methods, and modes for implementing a millimeter wave sensor to optimize operation of a beamforming microphone array that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a beamforming microphone array is provided, comprising: a plurality of microphones each of which is adapted to receive an acoustic audio signal and convert the same to a microphone (mic) audio signal; a wave sensor system adapted to determine locations of one or more people within a predetermined area about the beamforming microphone array and output the same as user location data signal; and an adaptive beamforming circuit adapted to receive the user location data signal and plurality of mic audio signals and perform adaptive beamforming on the plurality of mic audio signals that takes into account the received user location data signal to adapt one or more beams to acquire sound from one or more specific locations in the predetermined area.

According to the first aspect of the embodiments, the wave sensor system comprises: a millimeter (mm) wave transmitter; and a wave receiver.

According to the first aspect of the embodiments, the wave sensor system comprises: an optical transmitter; and an optical receiver.

According to the first aspect of the embodiments, the wave sensor system is further adapted to generate a three dimensional image of the predetermined area and output the same as an area image data signal.

According to the first aspect of the embodiments, the adaptive beamforming circuit is further adapted to receive the area image data signal and the plurality of mic audio signals and perform adaptive beamforming on the plurality of mic audio signals that takes into account the received area image data signal to adapt one or more beams to acquire sound from one or more specific locations in the predetermined area.

According to the first aspect of the embodiments, the adaptive beamforming circuit is adapted to modify the beam audio signals to reduce noise reflected off one or more objects within the predetermined area based on the area image data signal.

According to the first aspect of the embodiments, the area image data signal comprises: information as to where motion is occurring within the predetermined area.

According to the first aspect of the embodiments, the information contained within the area image data signal that motion is occurring within the predetermined area substantially eliminates objects that are substantially at rest.

According to the first aspect of the embodiments, the information contained within the area image data signal that motion is occurring within the predetermined area does not include objects that move with a substantial constant velocity.

According to the first aspect of the embodiments, the object that moves with a substantially constant periodicity comprises a fan.

According to the first aspect of the embodiments, the area image data signal comprises: distance information between the wave sensor system and objects within the predetermined area.

According to the first aspect of the embodiments, the objects comprise one or more of a floor, table, walls, and other furniture.

According to the first aspect of the embodiments, the adaptive beamforming circuit is further adapted to adapt one or more beams that takes into account the distance information generated by the wave sensor system.

According to the first aspect of the embodiments, the adaptive beamforming circuit is adapted to modify one or more of a beam width, beam reception angle, and range of the beam based on the received distance information generated by the wave sensor system.

According to the first aspect of the embodiments, the adaptive beamforming circuit is further adapted to receive the area image data signal, the user location data signal, and the plurality of mic audio signals, and perform adaptive beamforming on the plurality of mic audio signals that takes into account the information in the area image data signal and the user location data signal, such that the adaptive beamforming circuit is further adapted to substantially ignore voice signals that originate from outside the areas where the users are located.

According to the first aspect of the embodiments, the adaptive beamforming circuit is further adapted to receive the area image data signal, the user location data signal, and the plurality of mic audio signals, and perform adaptive beamforming on the plurality of mic audio signals that takes into account the information in the area image data signal and the user location data signal, such that the adaptive beamforming circuit is further adapted to substantially ignore audio signals generated from one or more of a television and stereo.

According to the first aspect of the embodiments, the predetermined area is a conference room, there is at least one table located in the conference room, and further wherein the area image data signal includes information as to a location of the at least one table in the conference room, and further wherein the adaptive beamforming circuit is adapted to generate one or more fixed beam positions covering a perimeter of the at least one table in the conference room.

According to the first aspect of the embodiments, the adaptive beamforming circuit comprises: an acoustic audio direction of arrival algorithm adapted to determine direction of arrival of one or more microphone generated audio signals.

According to the first aspect of the embodiments, the direction of arrival algorithm is adapted to determine a direction of arrival of the one or more microphone generated audio signals using information in the area image data signal received from the wave sensor system.

According to the first aspect of the embodiments, the wave sensor system can determine motion of one or more objects located in the predetermined area.

According to the first aspect of the embodiments, the wave sensor system can include the object motion information about the predetermined area in the area image data signal, and wherein the adaptive beamforming circuit can eliminate fixed objects and objects moving at a substantially constant rate to determine a number of people located in the predetermined area, and output the same as a room occupancy status.

According to the first aspect of the embodiments, the room occupancy status can be used by other interconnected systems to control one or more of lights, temperature, and audio-video equipment in the conference room.

According to the first aspect of the embodiments, the room occupancy status can be transmitted to a room monitoring system.

According to the first aspect of the embodiments, the predetermined area comprises: a conference room.

According to the first aspect of the embodiments, the adaptive beamforming circuit is further adapted to generate one or more beams to acquire sound from one or more specific locations in the predetermined area.

According to the first aspect of the embodiments, wherein the beamforming microphone array further comprises: a plurality of acoustic echo cancellation devices, one for each of the plurality of microphones, wherein each is adapted to receive the mic audio signal from a respective one of the plurality of microphones, perform acoustic echo cancellation on the received mic audio signal, and output an echo-corrected mic audio signal.

According to the first aspect of the embodiments, the beamforming microphone array further comprises: a first communication device adapted to receive a reference signal from a remote source, and forward the same to each of the one or more acoustic echo cancellation devices, and wherein each of the one or more acoustic echo cancellation devices is adapted to delete the reference signal from a respective one of the microphone audio signals received by the respective acoustic echo cancellation devices.

According to the first aspect of the embodiments, the reference signal comprises a far end audio signal.

According to the first aspect of the embodiments, the adaptive beamforming circuit is adapted to adapt new beams no faster than a first beam formation rate, and wherein the acoustic echo cancellation device is adapted to perform echo cancellation no faster than a first echo cancellation rate, and still further wherein the first echo cancellation rate and the first beam formation rate are substantially equivalent.

According to the first aspect of the embodiments, the wave sensor system is adapted to resolve distances within the predetermined area within about 1 mm and within about 1 degree.

According to the first aspect of the embodiments, the predetermined area is a conference room, and the adaptive beamforming circuit is adapted to extract location information for each person in the conference room and is further adapted to adapt a respective fixed beam position for each person in the conference room.

According to the first aspect of the embodiments, the predetermined area is a conference room, and if the user location data signal indicates that there are more people than beams that can be formed, then the adaptive beamforming circuit is further adapted to modify one or more of the fixed beam positions to cover two or more people in the conference room such that each person is covered by at least one fixed beam.

According to the first aspect of the embodiments, the adaptive beamforming circuit is adapted to adjust a beam width and shape to cover two or more people in the conference room.

According to the first aspect of the embodiments, the adaptive beamforming circuit comprises: an automixer algorithm, and wherein the adaptive beamforming circuit is adapted to adapt multiple beams and then combine the multiple beams to produce a single audio signal using the automixer algorithm.

According to the first aspect of the embodiments, the beamforming microphone array further comprises: an active noise reduction circuit adapted to remove noise from an output of the adaptive beamforming circuit, and output a noise reduced audio signal; an Ethernet communication device adapted to receive a far end audio signal from a remote location and output the same to one or more speakers and to each of the acoustic echo cancellation devices, and wherein the Ethernet communication device is further adapted to receive as an input the noise reduced audio signal from the active noise reduction circuit, and output the same to the remote location; and a power-over-Ethernet device adapted to extract electrical power over Ethernet communications cables and provide the electrical power to the circuits in the beamforming array.

According to the first aspect of the embodiments, the beamforming microphone array further comprises: one or more of each of light sensors, temperature sensors, and humidity sensors, and wherein the beamforming microphone array is adapted to receive as inputs outputs from each of the sensors, and output the sensor outputs through the Ethernet communication device.

According to the first aspect of the embodiments, the wave sensor system is adapted to recognize gestures including one or more of hand motion and arm motion.

According to the first aspect of the embodiments, the recognized gestures can control one or more functions in the conference room, and wherein the functions include one or more of lighting levels, audio levels, temperature levels, humidity levels, and positions of shades and/or curtains.

According to a second aspect of the embodiments, a beamforming microphone array is provided comprising: a plurality of microphones each of which is adapted to receive an acoustic audio signal and convert the same to a microphone (mic) audio signal; a wave sensor system adapted to determine locations of one or more people within a predetermined area about the beamforming microphone array and output the same as user location data signal; and an adaptive beamforming circuit adapted to receive the user location data signal and plurality of mic audio signals and perform adaptive beamforming on the plurality of mic audio signals that takes into account the received user location data signal to adapt a plurality of beam signals, one for each of the microphones, to acquire sound from one or more specific locations in the predetermined area; and a plurality of acoustic echo cancellation devices, one for each of the beam signal outputs from the adaptive beamforming circuit, wherein each of the plurality of acoustic echo cancellation devices is adapted to receive a respective beam signal from the adaptive beamforming circuit and perform acoustic echo cancellation on the received respective beam signal and output the echo-corrected beam signal.

According to the second aspect of the embodiments, the wave sensor system comprises: a millimeter (mm) wave transmitter; and a wave receiver.

According to the second aspect of the embodiments, the wave sensor system comprises: an optical transmitter; and an optical receiver.

According to the second aspect of the embodiments, the wave sensor system is further adapted to generate a three dimensional image of the predetermined area and output the same as an area image data signal.

According to the second aspect of the embodiments, the adaptive beamforming circuit is further adapted to receive the area image data signal and the plurality of mic audio signals and perform adaptive beamforming on the plurality of mic audio signals that takes into account the received area image data signal to adapt one or more beams to acquire sound from one or more specific locations in the predetermined area.

According to aspect of the embodiments, the adaptive beamforming circuit is adapted to modify the beam audio signals to reduce noise reflected off one or more objects within the predetermined area based on the area image data signal.

According to the second aspect of the embodiments, the area image data signal comprises: information as to where motion is occurring within the predetermined area.

According to the second aspect of the embodiments, the information contained within the area image data signal that motion is occurring within the predetermined area substantially eliminates objects that are substantially at rest.

According to the second aspect of the embodiments, the information contained within the area image data signal that motion is occurring within the predetermined area does not include objects that move with a substantial constant velocity.

According to the second aspect of the embodiments the object that moves with a substantially constant periodicity comprises a fan.

According to the second aspect of the embodiments, the area image data signal comprises: distance information between the wave sensor system and objects within the predetermined area.

According to the second aspect of the embodiments, the objects comprise one or more of a floor, table, walls, and other furniture.

According to the second aspect of the embodiments, the adaptive beamforming circuit is further adapted to adapt one or more beams that takes into account the distance information generated by the wave sensor system.

According to the second aspect of the embodiments, the adaptive beamforming circuit is adapted to modify one or more of a beam width, beam reception angle, and range of the beam based on the received distance information generated by the wave sensor system.

According to the second aspect of the embodiments, the adaptive beamforming circuit is further adapted to receive the area image data signal, the user location data signal, and the plurality of mic audio signals, and perform adaptive beamforming on the plurality of mic audio signals that takes into account the information in the area image data signal and the user location data signal, such that the adaptive beamforming circuit is further adapted to substantially ignore voice signals that originate from outside the areas where the users are located.

According to the second aspect of the embodiments, the adaptive beamforming circuit is further adapted to receive the area image data signal, the user location data signal, and the plurality of mic audio signals, and perform adaptive beamforming on the plurality of mic audio signals that takes into account the information in the area image data signal and the user location data signal, such that the adaptive beamforming circuit is further adapted to substantially ignore audio signals generated from one or more of a television and stereo.

According to the second aspect of the embodiments, the predetermined area is a conference room, there is at least one table located in the conference room, and further wherein the area image data signal includes information as to a location of the at least one table in the conference room, and further wherein the adaptive beamforming circuit is adapted to adapt one or more fixed beam positions covering a perimeter of the at least one table in the conference room.

According to the second aspect of the embodiments, the adaptive beamforming circuit comprises: an acoustic audio direction of arrival algorithm adapted to determine direction of arrival of one or more microphone generated audio signals.

According to the second aspect of the embodiments, the direction of arrival algorithm is adapted to determine a direction of arrival of the one or more microphone generated audio signals using information in the area image data signal received from the wave sensor system.

According to the second aspect of the embodiments, the wave sensor system can determine motion of one or more objects located in the predetermined area.

According to the second aspect of the embodiments, the wave sensor system can include the object motion information about the predetermined area in the area image data signal, and wherein the adaptive beamforming circuit can eliminate fixed objects and objects moving at a substantially constant rate to determine a number of people located in the predetermined area, and output the same as a room occupancy status.

According to the second aspect of the embodiments, the room occupancy status can be used by other interconnected systems to control one or more of lights, temperature, and audio-video equipment in the conference room.

According to the second aspect of the embodiments, the room occupancy status can be transmitted to a room monitoring system.

According to the second aspect of the embodiments, the predetermined area comprises: a conference room.

According to the second aspect of the embodiments, the adaptive beamforming circuit is further adapted to generate one or more beams to acquire sound from one or more specific locations in the predetermined area.

According to the second aspect of the embodiments, the adaptive beamforming circuit is adapted to generate new beams no faster than a first beam formation rate, and wherein the acoustic echo cancellation device is adapted to perform echo cancellation no faster than a first echo cancellation rate, and still further wherein the first echo cancellation rate and the first beam formation rate are substantially equivalent.

According to the second aspect of the embodiments, the wave sensor system is adapted to resolve distances within the predetermined area within about 1 mm and within about 1 degree.

According to the second aspect of the embodiments, the predetermined area is a conference room, and the adaptive beamforming circuit is adapted to extract location information for each person in the conference room and generate a respective fixed beam position for each person in the conference room.

According to the second aspect of the embodiments, the predetermined area is a conference room, and if the user location data signal indicates that there are more people than beams that can be formed, then the adaptive beamforming circuit is further adapted to modify one or more of the fixed beam positions to cover two or more people in the conference room such that each person is covered by at least one fixed beam.

According to the second aspect of the embodiments, the adaptive beamforming circuit is adapted to adjust a beam width and shape to cover two or more people in the conference room.

According to the second aspect of the embodiments, the adaptive beamforming circuit further comprises: a plurality of active noise reduction circuits, one for each acoustic echo cancellation device, and wherein each of the active noise reduction circuits is adapted to remove noise from an output of its respective acoustic echo cancellation device and output a noise reduced audio signal; an N−1 auto-mixer device adapted to receive the plurality of noise reduced audio signals from the plurality of active noise reductions circuits and combine the plurality of noise reduced audio signals to output a single near end audio signal; and an Ethernet communication device adapted to receive a reference signal from a remote source, output the same to one or more speakers in the predetermined area, and forward the same to each of the one or more acoustic echo cancellation devices, and wherein each of the one or more acoustic echo cancellation devices is adapted to delete the reference signal from a respective one of the microphone audio signals received by the respective acoustic echo cancellation devices; and a power-over-Ethernet device adapted to extract electrical power over Ethernet communications cables and provide the electrical power to the circuits in the beamforming array.

According to the second aspect of the embodiments, the reference signal comprises a far end audio signal.

According to the second aspect of the embodiments, the beamforming microphone array further comprises: one or more of each of light sensors, temperature sensors, and humidity sensors, and wherein the beamforming microphone array is adapted to receive as inputs outputs from each of the sensors, and output the sensor outputs through the Ethernet communication device.

According to the second aspect of the embodiments, the wave sensor system is adapted to recognize gestures including one or more of hand motion and arm motion.

According to the second aspect of the embodiments, the recognized gestures can control one or more functions in the conference room, and wherein the functions include one or more of lighting levels, audio levels, temperature levels, humidity levels, and positions of shades and/or curtains.

According to a third aspect of the embodiments, a method for operating a beamforming microphone array for use in a predetermined area is provided, the method comprising: receiving acoustic audio signals at each of a plurality of microphones, converting the same to an electrical mic audio signal, and outputting each of the plurality of electrical mic audio signals; generating a user location data signal by a wave sensor system, and outputting the user location data signal, wherein the user location data signal includes location information of one or more people within the predetermined area; receiving both the user location data signal and plurality of echo-corrected mic audio signals at an adaptive beamforming device; and adapting one or more beams by the adaptive beamforming device based on the user location data signal and plurality of mic audio signals wherein each of the one or more beams acquires sound from one or more specific locations in the predetermined area.

According to the third aspect of the embodiments, the wave sensor system comprises: a millimeter (mm) wave transmitter; and a wave receiver.

According to the third aspect of the embodiments, the wave sensor system comprises: an optical transmitter; and an optical receiver.

According to the third aspect of the embodiments, the method further comprises: generating a three dimensional image of the predetermined area by the wave sensor system; and outputting the same as an area image data signal.

According to the third aspect of the embodiments, the method further comprises: receiving the area image data signal and the plurality of mic audio signals by the adaptive beamforming circuit; performing adaptive beamforming on the plurality of mic audio signals that takes into account the received area image data signal and the plurality of mic audio signals; and adapting one or more beams to acquire sound from one or more specific locations in the predetermined area.

According to the third aspect of the embodiments, the method further comprises: modifying the beam audio signals by the adaptive beamforming circuit to reduce noise reflected off one or more objects within the predetermined area based on the area image data signal.

According to the third aspect of the embodiments, the area image data signal comprises: information as to where motion is occurring within the predetermined area. According to the third aspect of the embodiments, the information contained within the area image data signal that motion is occurring within the predetermined area substantially eliminates objects that are substantially at rest.

According to the third aspect of the embodiments, the information contained within the area image data signal that motion is occurring within the predetermined area does not include objects that move with a substantial constant velocity.

According to the third aspect of the embodiments, the object that moves with a substantially constant periodicity comprises a fan.

According to the third aspect of the embodiments, the area image data signal comprises: distance information between the wave sensor system and objects within the predetermined area.

According to the third aspect of the embodiments, the objects comprise one or more of a floor, table, walls, and other furniture.

According to the third aspect of the embodiments, the method further comprises: adapting one or more beams by the adaptive beamforming circuit that takes into account the distance information generated by the wave sensor system.

According to the third aspect of the embodiments, the method further comprises: modifying, by the adaptive beamforming circuit, one or more of a beam width, beam reception angle, and range of the beam based on the received distance information generated by the wave sensor system.

According to the third aspect of the embodiments, the method further comprises: receiving, by the adaptive beamforming circuit, the area image data signal, the user location data signal, and the plurality of mic audio signals; and performing adaptive beamforming on the plurality of mic audio signals that takes into account the information in the area image data signal and the user location data signal, such that the adaptive beamforming circuit substantially ignores voice signals that originate from outside the areas where the users are located.

According to the third aspect of the embodiments, the method further comprises: receiving, by the adaptive beamforming circuit, the area image data signal, the user location data signal, and the plurality of mic audio signals; and performing adaptive beamforming on the plurality of mic audio signals that takes into account the information in the area image data signal and the user location data signal, such that the adaptive beamforming circuit substantially ignore audio signals generated from one or more of a television and stereo.

According to the third aspect of the embodiments, the predetermined area is a conference room, there is at least one table located in the conference room, and further wherein the area image data signal includes information as to a location of the at least one table in the conference room, and the method further comprises: generating, by the adaptive beamforming circuit, one or more fixed beam positions covering a perimeter of the at least one table in the conference room.

According to the third aspect of the embodiments, the method further comprises: determining, by an acoustic audio direction of arrival algorithm operating within the adaptive beamforming circuit, a direction of arrival of one or more microphone generated audio signals.

According to the third aspect of the embodiments, the method further comprises: determining, by the direction of arrival algorithm, a direction of arrival of the one or more microphone generated audio signals using information in the area image data signal received from the wave sensor system.

According to the third aspect of the embodiments, the method further comprises: determining, by the wave sensor system, motion of one or more objects located in the predetermined area.

According to the third aspect of the embodiments, the wave sensor system can include the object motion information about the predetermined area in the area image data signal, and wherein the adaptive beamforming circuit can eliminate fixed objects and objects moving at a substantially constant rate to determine a number of people located in the predetermined area, and output the same as a room occupancy status.

According to the third aspect of the embodiments, the room occupancy status can be used by other interconnected systems to control one or more of lights, temperature, and audio-video equipment in the conference room.

According to the third aspect of the embodiments, the room occupancy status can be transmitted to a room monitoring system.

According to the third aspect of the embodiments, the predetermined area comprises: a conference room.

According to the third aspect of the embodiments, the method further comprises: generating, by the adaptive beamforming circuit, one or more beams to acquire sound from one or more specific locations in the predetermined area.

According to the third aspect of the embodiments, the method further comprises: receiving, by a plurality of acoustic echo cancellation devices, one for each of the plurality of microphones, the mic audio signal from a respective one of the plurality of microphones; performing acoustic echo cancellation on the received mic audio signal; and outputting an echo-corrected mic audio signal.

According to the third aspect of the embodiments, the method further comprises: receiving, by a first communication device adapted to receive a reference signal from a remote source, and forward the same to each of the one or more acoustic echo cancellation devices, and wherein each of the one or more acoustic echo cancellation devices is adapted to delete the reference signal from a respective one of the microphone audio signals received by the respective acoustic echo cancellation devices.

According to the third aspect of the embodiments, the reference signal comprises a far end audio signal.

According to the third aspect of the embodiments, the method further comprises: the adaptive beamforming circuit adapting to new beams no faster than a first beam formation rate; and the acoustic echo cancellation device performing echo cancellation no faster than a first echo cancellation rate, and wherein the first echo cancellation rate and the first beam formation rate are substantially equivalent.

According to the third aspect of the embodiments, the wave sensor system is adapted to resolve distances within the predetermined area within about 1 mm and within about 1 degree.

According to the third aspect of the embodiments, the predetermined area is a conference room, and the method further comprises: extracting, by the adaptive beamforming circuit, location information for each person in the conference room, and adapting a respective fixed beam position for each person in the conference room.

According to the third aspect of the embodiments, the predetermined area is a conference room, and if the user location data signal indicates that there are more people than beams that can be formed, then modifying, by the adaptive beamforming circuit, one or more of the fixed beam positions to cover two or more people in the conference room such that each person is covered by at least one fixed beam.

According to the third aspect of the embodiments, the method further comprises: adjusting, by the adaptive beamforming circuit, a beam width and shape to cover two or more people in the conference room.

According to the third aspect of the embodiments, the adaptive beamforming circuit comprises: an automixer algorithm, and wherein the method further comprises adapting, by the adaptive beamforming circuit, multiple beams and combing the multiple beams to produce a single audio signal using the automixer algorithm.

According to the third aspect of the embodiments, the method further comprises: removing, by an active noise reduction circuit, noise from an output of the adaptive beamforming circuit, and outputting a noise reduced audio signal; receiving, by an Ethernet communication device, a far end audio signal from a remote location and outputting the same to one or more speakers and to each of the acoustic echo cancellation devices; receiving, by the Ethernet communication device, as an input the noise reduced audio signal from the active noise reduction circuit, and outputting the same to the remote location; and extracting, by a power-over-Ethernet device, electrical power over Ethernet communications cables and providing the electrical power to the circuits in the beamforming array.

According to the third aspect of the embodiments, the predetermined area further comprises: one or more of each of light sensors, temperature sensors, and humidity sensors, and wherein the method further comprises receiving, by the beamforming microphone array, as inputs the outputs from each of the sensors, and outputting the sensor outputs through the Ethernet communication device.

According to the third aspect of the embodiments, the method further comprises: recognizing, by the wave sensor system, gestures including one or more of hand motion and arm motion.

According to the third aspect of the embodiments, the recognized gestures can control one or more functions in the conference room, and wherein the functions include one or more of lighting levels, audio levels, temperature levels, humidity levels, and positions of shades and/or curtains.

According to the fourth aspect of the embodiments,

According to a fourth aspect of the embodiments, a method for operating a beamforming microphone array for use in a predetermined area is provided, comprising: receiving acoustic audio signals at each of a plurality of microphones, converting the same to an electrical mic audio signal, and outputting each of the plurality of electrical mic audio signals; generating a user location data signal by a wave sensor system, and outputting the user location data signal, wherein the user location data signal includes location information of one or more people within the predetermined area; receiving both the user location data signal and plurality of mic audio signals at an adaptive beamforming device; adapting one or more beams by the adaptive beamforming device based on the user location data signal and plurality of output electrical mic audio signals wherein each of the one or more beams acquires sound from one or more specific locations in the predetermined area; and performing acoustic echo cancellation on each of the one or more beams output from the adaptive beamforming device.

According to the fourth aspect of the embodiments, the wave sensor system comprises: a millimeter (mm) wave transmitter; and a wave receiver.

According to the fourth aspect of the embodiments, the wave sensor system comprises: an optical transmitter; and an optical receiver.

According to the fourth aspect of the embodiments, the method further comprises: generating, by the wave sensor system, a three dimensional image of the predetermined area and output the same as an area image data signal.

According to the fourth aspect of the embodiments, the method further comprises: receiving, by the adaptive beamforming circuit, the area image data signal and the plurality of mic audio signals; and performing adaptive beamforming on the plurality of mic audio signals that takes into account the received area image data signal to adapt one or more beams to acquire sound from one or more specific locations in the predetermined area.

According to the fourth aspect of the embodiments, the method further comprises: modifying, by the adaptive beamforming circuit, the beam audio signals to reduce noise reflected off one or more objects within the predetermined area based on the area image data signal.

According to the fourth aspect of the embodiments, the area image data signal comprises: information as to where motion is occurring within the predetermined area.

According to the fourth aspect of the embodiments, the information contained within the area image data signal that motion is occurring within the predetermined area substantially eliminates objects that are substantially at rest.

According to the fourth aspect of the embodiments, the information contained within the area image data signal that motion is occurring within the predetermined area does not include objects that move with a substantial constant velocity.

According to the fourth aspect of the embodiments, the object that moves with a substantially constant periodicity comprises a fan.

According to the fourth aspect of the embodiments, the area image data signal comprises: distance information between the wave sensor system and objects within the predetermined area.

According to the fourth aspect of the embodiments, the objects comprise one or more of a floor, table, walls, and other furniture.

According to the fourth aspect of the embodiments, the method further comprises: adapting, by the adaptive beamforming circuit, one or more beams that takes into account the distance information generated by the wave sensor system.

According to the fourth aspect of the embodiments, the method further comprises: modifying, by the adaptive beamforming circuit, one or more of a beam width, beam reception angle, and range of the beam based on the received distance information generated by the wave sensor system.

According to the fourth aspect of the embodiments, the method further comprises; receiving, by the adaptive beamforming circuit, the area image data signal, the user location data signal, and the plurality of mic audio signals; and performing adaptive beamforming on the plurality of mic audio signals that takes into account the information in the area image data signal and the user location data signal, such that the adaptive beamforming circuit is further adapted to substantially ignore voice signals that originate from outside the areas where the users are located.

According to the fourth aspect of the embodiments, the method further comprises: receiving, by the adaptive beamforming circuit, the area image data signal, the user location data signal, and the plurality of mic audio signals; and performing adaptive beamforming on the plurality of mic audio signals that takes into account the information in the area image data signal and the user location data signal, such that the adaptive beamforming circuit is further adapted to substantially ignore audio signals generated from one or more of a television and stereo.

According to the fourth aspect of the embodiments, the predetermined area is a conference room, there is at least one table located in the conference room, and further wherein the area image data signal includes information as to a location of the at least one table in the conference room, and wherein the method further comprises: adapting, by the adaptive beamforming circuit, one or more fixed beam positions to cover a perimeter of the at least one table in the conference room.

According to the fourth aspect of the embodiments, the method further comprises: determining a direction of arrival of one or more microphone generated audio signals by an acoustic audio direction of arrival algorithm stored with the adaptive beamforming circuit.

According to the fourth aspect of the embodiments, the method further comprises: determining the direction of arrival of the one or more microphone generated audio signals, in the adaptive beamforming circuit, using information in the area image data signal received from the wave sensor system.

According to the fourth aspect of the embodiments, the method further comprises: determining, by the wave sensor system, motion of one or more objects located in the predetermined area.

According to the fourth aspect of the embodiments, the wave sensor system can include the object motion information about the predetermined area in the area image data signal, and wherein the method further comprises: substantially eliminating, by the adaptive beamforming circuit, fixed objects and objects moving at a substantially constant rate to determine a number of people located in the predetermined area, and output the same as a room occupancy status.

According to the fourth aspect of the embodiments, the method further comprises: using the room occupancy status by other interconnected systems to control one or more of lights, temperature, and audio-video equipment in the conference room.

According to the fourth aspect of the embodiments, the method further comprises: transmitting the room occupancy status to a room monitoring system.

According to the fourth aspect of the embodiments, the predetermined area comprises: a conference room.

According to the fourth aspect of the embodiments, the method further comprises: generating, by the adaptive beamforming circuit, one or more beams to acquire sound from one or more specific locations in the predetermined area.

According to the fourth aspect of the embodiments, the method further comprises: receiving, by a first communication device, a reference signal from a remote source; forwarding the reference signal to each of the one or more of the acoustic echo cancellation devices; and deleting, by each of the one or more acoustic echo cancellation devices, the reference signal from a respective one of the microphone audio signals received by the respective acoustic echo cancellation devices.

According to the fourth aspect of the embodiments, wherein the reference signal comprises a far end audio signal.

According to the fourth aspect of the embodiments, the method further comprises: generating, by the adaptive beamforming circuit, new beams no faster than a first beam formation rate; and performing, by the acoustic echo cancellation device, echo cancellation no faster than a first echo cancellation rate, and still further wherein the first echo cancellation rate and the first beam formation rate are substantially equivalent.

According to the fourth aspect of the embodiments, wherein the wave sensor system is adapted to resolve distances within the predetermined area within about 1 mm and within about 1 degree.

According to the fourth aspect of the embodiments, wherein the predetermined area is a conference room, and wherein the method further comprises: extracting, by the adaptive beamforming circuit, location information for each person in the conference room; and generating a respective fixed beam position for each person in the conference room.

According to the fourth aspect of the embodiments, wherein the predetermined area is a conference room, and wherein the method further comprises: modifying, by the adaptive beamforming circuit, if the user location data signal indicates that there are more people than beams that can be formed, one or more of the fixed beam positions to cover two or more people in the conference room such that each person is covered by at least one fixed beam.

According to the fourth aspect of the embodiments, the method further comprises: adjusting, by the adaptive beamforming circuit, a beam width and shape to cover two or more people in the conference room.

According to the fourth aspect of the embodiments, the method further comprises: removing noise, by a plurality of active noise reduction circuits, one for each acoustic echo cancellation device, from an output of its respective acoustic echo cancellation device; outputting a noise reduced audio signal; receiving, by an N−1 auto-mixer device, the plurality of noise reduced audio signals from the plurality of active noise reductions circuits; combining the plurality of noise reduced audio signals to output a single near end audio signal; and receiving, by an Ethernet communication device, a reference signal from a remote source; outputting the reference signal to one or more speakers in the predetermined area; forwarding the reference signal to each of the one or more acoustic echo cancellation devices; deleting, by the acoustic echo cancellation device, the reference signal from a respective one of the microphone audio signals received by the respective acoustic echo cancellation devices; and extracting, by a power-over-Ethernet device, electrical power over one or more Ethernet communications cables and providing the electrical power to the circuits in the beamforming microphone array.

According to the fourth aspect of the embodiments, the reference signal comprises a far end audio signal.

According to the fourth aspect of the embodiments, the method further comprises: outputting, by one or more of each of light sensors, temperature sensors, and humidity sensors, status outputs from each of the sensors; receiving the sensors outputs by the Ethernet communications device; and transmitting, by the Ethernet communications device, the sensor outputs.

According to the fourth aspect of the embodiments, the method further comprises: recognizing, by the wave sensor system, gestures including one or more of hand motion and arm motion.

According to the fourth aspect of the embodiments, the recognized gestures can control one or more functions in the conference room, and wherein the functions include one or more of lighting levels, audio levels, temperature levels, humidity levels, and positions of shades and/or curtains.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

DETAILED DESCRIPTION

Figure 1:
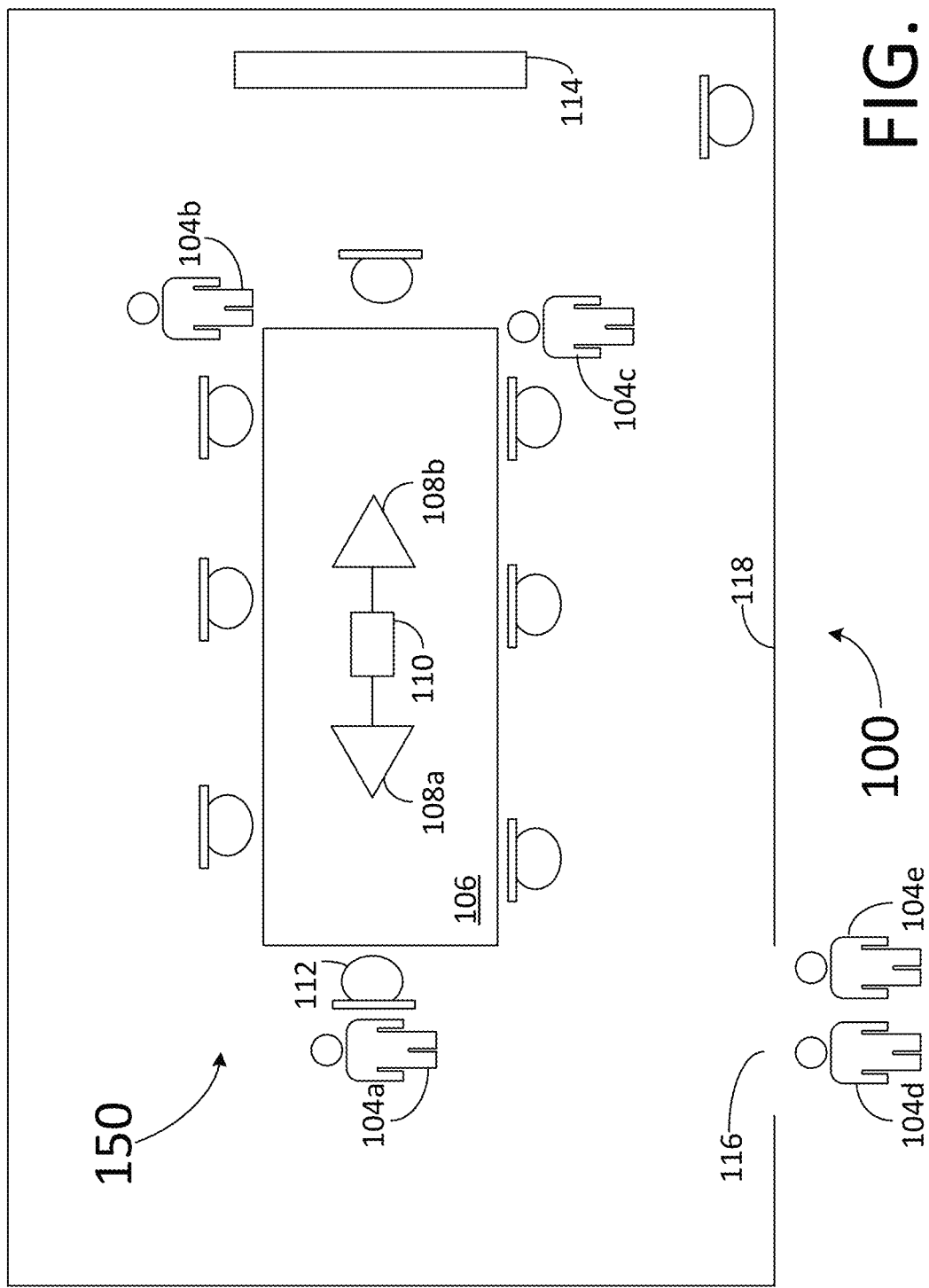
FIG. 1 illustrates a top view of a room that uses a known audio-conferencing system.

The embodiments are described more fully hereinafter with reference to the accompanying drawings, in which embodiments of the inventive concept are shown. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as audio systems and related devices, audio-networking devices, and mechanical systems related to audio systems and devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following table is a list of the major elements in the drawings in numerical order.
100 Room
104 People
106 Table
108 Speaker/Microphone Assembly
110 Conference System Processor (Processor)
112 Chair
114 Audio/Video (NV) Display
116 Door
118 Wall
150 Audio Conferencing System (ACS)
200 Audio Processing System
202 Microphone (Mic)
204 Acoustic Echo Cancellation Device (AECD)
206 Adaptive Beamforming Circuitry
208 Active Noise Reduction (ANR) Circuit
210 Network (NW) Interface (I/F) (Audio Conference Computer)
212 Millimeter (mm) Wave Antenna (MWA)
214 Millimeter Wave Transceiver (MWT)
216 Power-over-Ethernet (PoE) Converter
218 Reference Line
220 Processor
222 Memory
224 Acoustic Echo Cancellation Software/Application (AEC App)
226 Adaptive Beamforming Software/Application (ABF App)
228 Active Noise Reduction Software/Application (ANR App)
230 Conference System Software/Application (CS App)
232 Network (Internet)
250 Wave Sensor System (WSS)
300 Audio Processing System
302 Auto Mixer
500 Method for Operating Audio Processor System 200
502-516 Method Steps in Method 500
600 Method for Operating Audio Processor System 300
602-618 Method Steps in Method 600
701 Shell/Box
702 Integrated Display/Touch-Screen (Display)
704 Internal Data/Command Bus (Bus)
706 Processor Internal Memory
710 Universal Serial Bus (USB) Port
711 Ethernet Port 712 Compact Disk (CD)/Digital Video Disk (DVD) Read/Write (RW) (CD/DVD/RW) Drive
714 Floppy Diskette Drive
716 Hard Disk Drive (HDD)
718 Read-Only Memory (ROM)
720 Random Access Memory (RAM)
722 Video Graphics Array (VGA) Port or High Definition Multimedia Interface (HDMI)
723 HDMI Cable
724 External Memory Storage Device
726 External Display/Touch-Screen (External Display)
728 Keyboard
730 Mouse
732 Processor Board/PC Internal Memory (Internal Memory)
734 Flash Drive Memory
736 CD/DVD Diskettes
738 Floppy Diskettes
742 Wi-Fi Transceiver
744 BlueTooth (BT) Transceiver
746 Near Field Communications (NFC) Transceiver
748 Third Generation (3G), Fourth Generation (4G), Long Term Evolution (LTE) (3G/4G/LTE) Transceiver
750 Communications Satellite/Global Positioning System (Satellite) Transceiver Device
752 Antenna
756 Universal Serial Bus (USB) Cable
758 Ethernet Cable (CATS)
760 Scanner/Printer/Fax Machine
800 Network System
802 Mobile Device
804 Personal Computer (PC)
806 Internet Service Provider (ISP)
808 Modulator/Demodulator (modem)
810 Wireless Router (WiFi)
812 Plain Old Telephone Service (POTS) Provider
814 Cellular Service Provider
818 Communications Satellite
820 Cellular Tower
824 GPS Station
826 Satellite Communication Systems Control Stations
828 Global Positioning System (GPS) Satellite List of Acronyms Used in the Specification in Alphabetical Order The following is a list of the acronyms used in the specification in alphabetical order.
3G Third Generation
4G Fourth Generation
ACS Audio Conferencing System
AEC Acoustic Echo Cancellation
AECD Acoustic Echo Cancellation Device
ANR Active Noise Reduction
App Application
ARM Advanced Reduced Instruction Set Computer Machines
ASIC Application Specific Integrated Circuitry
A/V Audio/Video
BIOS Basic Input/Output System
BT BlueTooth
CD Compact Disk
CRC Cyclic Redundancy Check
CRT Cathode Ray Tubes
DSP Digital Signal Processor
DVD Digital Video/Versatile Disk
EEPROM Electrically Erasable Programmable Read Only Memory
FE Far End
FEC Forward Error Correction
FPGA Field Programmable Gate Array Structures
GAN Global Area Network
GPS Global Positioning System
HDD Hard Disk Drive
HDMI High Definition Multimedia Interface
HVAC Heating Ventilation and Air Conditioning
Hz Hertz
I2S Inter-Integrated Circuit Sound
I/F Interface
IP Internet Protocol ISP Internet Service Provider
KHz Kilo-Hertz
LCD Liquid Crystal Display
LED Light Emitting Diode Display
LSB Least Significant Bit
LTE Long Term Evolution
Mic Microphone
MIPS Mega Instructions-Per-Second
MODEM Modulator-Demodulator
MSB Most Significant Bit
Msec Millisecond
MWA Millimeter Wave Antenna
MWT Millimeter Wave Transceiver
NFC Near Field Communication
NLP Non-linear Processing
N/W Network
PC Personal Computer
POTS Plain Old Telephone Service
PTP Precision Time Protocol
RAM Random Access Memory
RISC Reduced Instruction Set Computer
ROM Read Only Memory
RW Read/Write
SIMD Single Instructor Multiple Data
SNR Signal-to-Noise Ratio
TDM Time Division Multiplexing
USB Universal Serial Bus
UVPROM Ultra-violet Erasable Programmable Read Only Memory
VGA Video Graphics Array
WSS Wave Sensor System The different aspects of the embodiments described herein pertain to the context of systems, methods, and modes for implementing a millimeter wave sensor to optimize operation of a beamforming microphone array, as well as for use in other home or enterprise systems, but is not limited thereto, except as may be set forth expressly in the appended claims.

For 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as further embodied in the attached drawings, can be manufactured by Crestron Electronics Inc., located in Rockleigh, N.J., and will be marketed and sold.

Aspects of the embodiments are directed towards systems, methods, and modes for implementing a millimeter wave sensor to optimize operation of a beamforming microphone array. Aspects of the embodiments can reduce the setup time for a mic array and improve mic array performance. Aspects of the embodiments can improve beam position and area coverage for better voice pickup, which results in increased voice intelligibility.

According to aspects of the embodiments, use of a millimeter wave sensor (or radar) allows for substantially automatic and periodic adjustment of an adapting beamforming microphone that then also improves the performance of beamforming while reducing the setup time and skill required.

As those of skill in the art can appreciate, millimeter waves are in the 30 to 300 GHz spectrum. Sensors exist that work in a subset of this band (60 to 81 GHz) and implement a radar functionality. According to aspects of the embodiments, transceivers can be utilized that incorporate substantially all of most of the functional requirements for such radar functions. As those of skill in the art can appreciate, such radar functionality can include a transmitter capable of transmitting a chirp modulated waveform. A chirp modulated waveform is one in which the frequency changes, either increasing or decreasing, typically in either a linear or exponential manner (or some other manner), between a first value to a second value.

As those of skill in the art can appreciate, a radar system uses a short burst of radio frequency energy that is emitted from a directional antenna. Objects reflect some of this energy back to a radio receiver located next to the transmitter. Since radio waves travel at a constant rate, the elapsed time between the transmitted and received signals provides the distance to the target. This brings up the first requirement for the pulse: it needs to be as short as possible. For example, a 1-microsecond pulse provides a radio burst about 300 meters long. This means that the distance information we obtain with the system will have a resolution of about this same length. If we want better distance resolution, we need a shorter pulse.

The second requirement is that in order to detect objects farther away, more energy is needed in the transmitted pulse. Unfortunately, more energy and shorter pulse are conflicting requirements. The electrical power needed to provide a pulse is equal to the energy of the pulse divided by the pulse length. Requiring both more energy and a shorter pulse makes electrical power handling a limiting factor in the system. The output stage of a radio transmitter can only handle so much power without destroying itself.

Chirp signals provide a way of breaking this limitation. Before the impulse reaches the final stage of the radio transmitter, it is passed through a chirp system. Instead of bouncing an impulse off the target aircraft, a chirp signal is used. After the chirp echo is received, the signal is passed through an anti-chirp system, restoring the signal to an impulse. This allows the portions of the system that measure distance to see short pulses, while the power handling circuits see long duration signals. This type of wave-shaping is a fundamental part of modern radar systems. As those of skill in the art can further appreciate, decreasing the amount of power transmitted in small room that will have people in it is generally preferable. Thus, even when used in rooms, transmitting chirp signals are a preferred means of object detection and resolution. According to further aspects of the embodiments, the transceiver further includes a receiver that receives and demodulates the received signal. Subsequently, a three-dimensional image of the room can be determined from the received returns.

FIG. 1 illustrates a top view of room 100 that uses a known audio-conferencing system (ACS) 150. ACS 150 comprises combined speaker and microphone (mic) 108, and conference system processor 110. In room 100 there is located a plurality of people 104a-c, with two such people 104d,e standing just outside room 100 near doorway 116. Also, in room 100 there are numerous chairs 112, display 114 (which may or not be tied into ACS 150), table 106, and walls and ceiling 118. Depending on the directionality of combined mics/speakers 108a,b there can one or more audio dropout zones, wherein it is more difficult to hear the audio output from the speaker, or to be heard by the mic. Such ACS 150 can also pick up conversations outside of room 100 at doorway 116, even with the use of beamforming.

Figure 2:
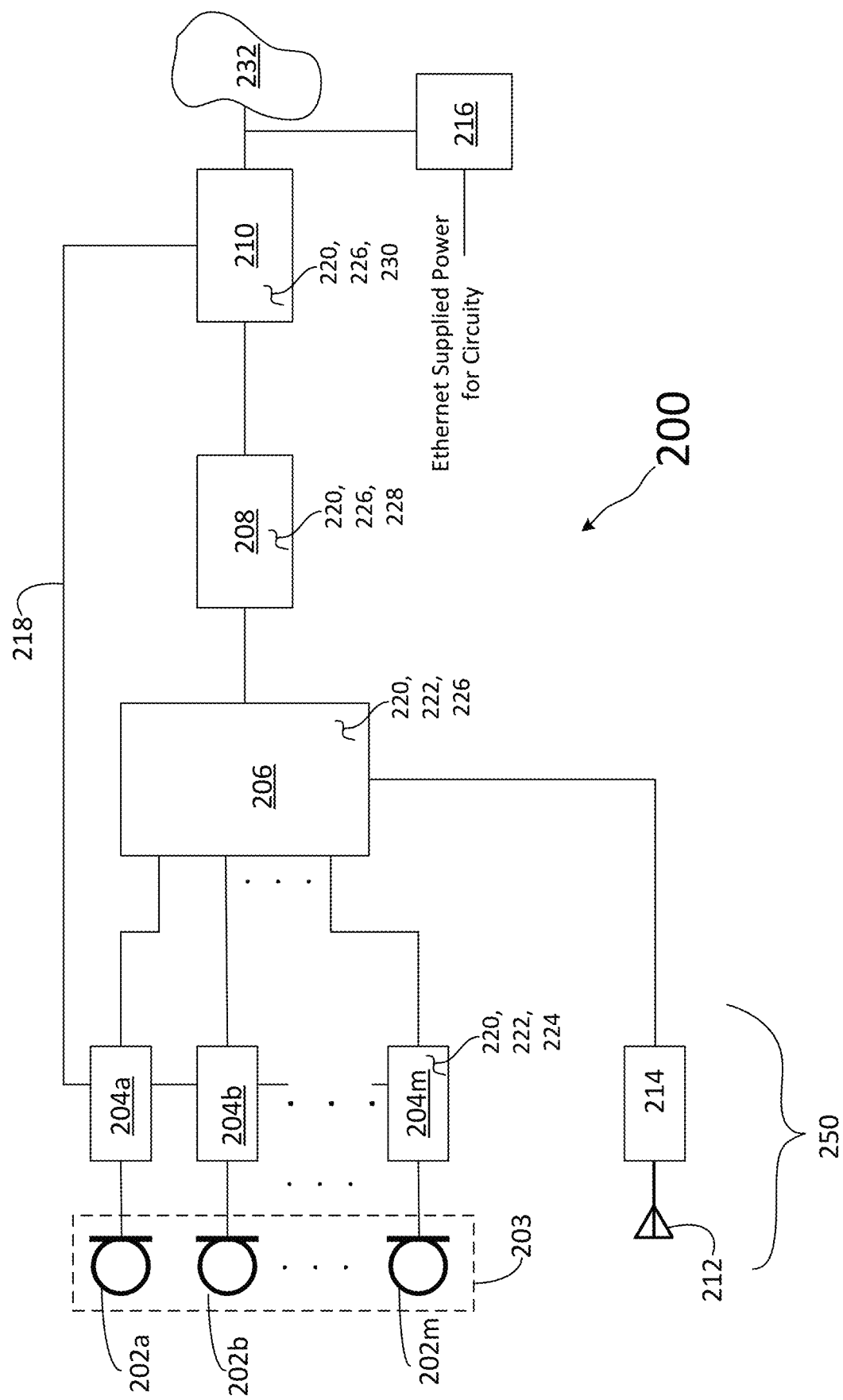
FIG. 2 illustrates a block diagram of an audio processing system characterized as using an adaptive beamformer with acoustic echo cancellation before beamforming for use with the room and conferencing system shown in FIGS. 1 and 4 that comprises an acoustic echo cancellation device (AECD), an adaptive beamforming circuit, and a millimeter wave sensor, among other devices, according to aspects of the embodiments.

FIG. 2 illustrates a block diagram of audio processing system (APS) 200 characterized as using an adaptive beamformer with acoustic echo cancellation before beamforming for use in a room and an audio-conferencing system according to aspects of the embodiments. APS 200 and APS 300, both of which are described below, can be used in the room as embodied in FIG. 4: FIG. 4 illustrates a top view of a room substantially similar that of FIG. 1, but which can include APSs 200, 300 of FIGS. 2 and 3, respectively, according to aspects of the embodiments. APS 200 comprises mic array 203 that comprises mics 202*a-m*, acoustic echo cancellation devices (AECD) 204*a-m*, adaptive beamforming circuit 206, active noise reduction (ANR) circuit 208, Ethernet network interface (NW IF) 210 (which can also be referred to as a "audio conference computer" and is discussed in greater detail in regard to FIGS. 7 and 8, and which is connected to network 232 (which, in a non-limiting example, is the Internet, but which can also be many other different types of networks), millimeter (mm) wave antenna (MWA) 212, and millimeter wave transceiver (MWT) 214, among other devices, according to aspects of the embodiments. MWA 212 and MWT 214 comprise wave sensor system (WSS) 250. Also included is power-over-Ethernet (PoE) converter 216. The far end audio signal is introduced to AECDs 204*a-m* via reference line 218. According to further aspects of the embodiments, WSS 250 can be an optical-based sensor system, wherein transceiver 214 would include an optical transmitter and receiver, and according to further aspects transceiver 214 can include a laser or infrared transmitter and receiver.

APS 200, as discussed above, is an audio processing system that can be characterized as an adaptive beamformer with AEC before beamforming. According to aspects of the embodiments, beamforming does not degrade the AEC in this case.

As those of skill in the art can further appreciate, the short wavelength of the transmitted signals of WSS 250 allows for small antennas (antennas are typically sized in terms of the wavelengths of the main frequency they are intended to transmit; in this case, MWA 212). Using WSS 250 also provides high precision to resolve distances in the mm range and angles down to about 1 degree (note that the resolution is also dictated by the length of the transmitted pulse). In addition to range and angle, object velocity can be calculated by WSS 250. An example of this technology is the Texas Instruments IWR1642 single chip millimeter (mm) wave sensor with integrating digital signal processor (DSP) and micro-controller unit (MCU).

Information from WSS 250 can be used to locate walls, floor, furniture and people, among other objects, within a space. People can be detected by detecting motion with certain characteristics. Processing can be used to reject static objects like chairs and dynamic objects like fans. Thereafter, a two or three dimensional "map" of the location of the people in a room can be sent to AEC/Beamformer device 204/206 according to aspects of the embodiments. in the form of a user location data signal (which would include the locations of one or more people using the area or room in which system 200 is located), or area image data signal (which would include a two or three dimensional map of the area or room, and include locations of many different object such as furniture, fans (and not whether they were moving or not), and people, walls, floor in the area or room in which system 200 is located, or the signals can be combined as one data signal output from WSS 250 and received by AEC/Beamformer device 204/206 according to aspects of the embodiments.

The performance of beamformer 206 in APS 200 can be optimized by combining the output of WSS 250, as described above, with beamformer 206. According to aspects of the embodiments, by measuring the distance to the floor, table and walls, and providing such distance information to beamformer 206, as shown in FIG. 2, the processor(s) in beamformer 206 can then optimize beam parameters such as beam width, beam reception angle, and ranges, to determine an optimum pickup pattern for a given room. According to aspects of the embodiments, there are numerous ways in which distance information can be used to shape beamforming scenarios. By way of a non-limiting example, the beam can be narrowed as the distance increases to improve the signal to noise ratio (SNR). According to a further non-limiting example, the distance information can be used to adjust the gain of the audio beam (meaning adjusting the sensitivity of the speaker and/or the gain coefficients for that particular speaker's output in beam formation). According to further aspects of the embodiments, the distance information can be used to make a three dimensional (3D) map of the room and the two angles-plus-distance can be converted to an XYZ map. According to further aspects of the embodiments, the 3D map and/or XYZ map can then be used to tell if something or someone were within the room boundary and we noise can be ignored from outside the room. Beamformer 206 can then adjust the beams to reduce the reflected noise coming off a wall. Furthermore, if beamformer 206 knows the location of every person in a room, beamformer 206 can be programmed to not adapt the beam to receive voices coming from outside the areas where people are located, or, using the data output form WSS 250, beamformer 206 can simply ignore audio, as much as possible, that originates outside the geographical area of the room. This can prevent targeting the beam to an open doorway thereby substantially reducing or eliminating hallway voice pickup, or to a transducer-speaker outputting the far end speech (as is shown in FIG. 2; speakers 208*a,b*).

According to further aspects of the embodiments, by targeting beams to only people 104 speaking in a room, the beamformer can reject or substantially reject all of the sound coming from a television or stereo, which thereby improves the use of intercoms or voice recognition services, like Alexa® from Amazon®. According to still further aspects of the embodiments, a beamformer that uses WSS 125 does not necessarily require a far end or A/V reference signal to cancel the detection of this "noise" in the AEC/beamforming system, although sending a reference to mic array 203 and incorporating AEC 204 can improve the undesired signal rejection further.

According to further aspects of the embodiments, improvements to beamforming performance are not solely limited to dynamic beamforming systems. Use of WSS 250 can also improve the performance of the fixed beam setup. As with the dynamic system, a distance map can be generated and used to identify a table in a room. According to aspects of the embodiments, a grid of fixed beam positions covering the outside perimeter of table 106 would be one advantageous starting point, among others, for setup of the fixed beam array. According to further aspects of the embodiments, the positon information generated by WSS 250 can also be used to make a fixed beam approach behave in a manner similar to that of an adaptive fixed beam. With such position information, beamformer 206 can configure the beams to point at people 104 in the room. As long as there are enough beam outputs available for people 104 in the room, a targeted beam can be placed on each person 104. If the number of people 104 exceeds the number of beams then the beam widths and shapes can be reconfigured to cover more than one person, according to further aspects of the embodiments.

Figure 3:
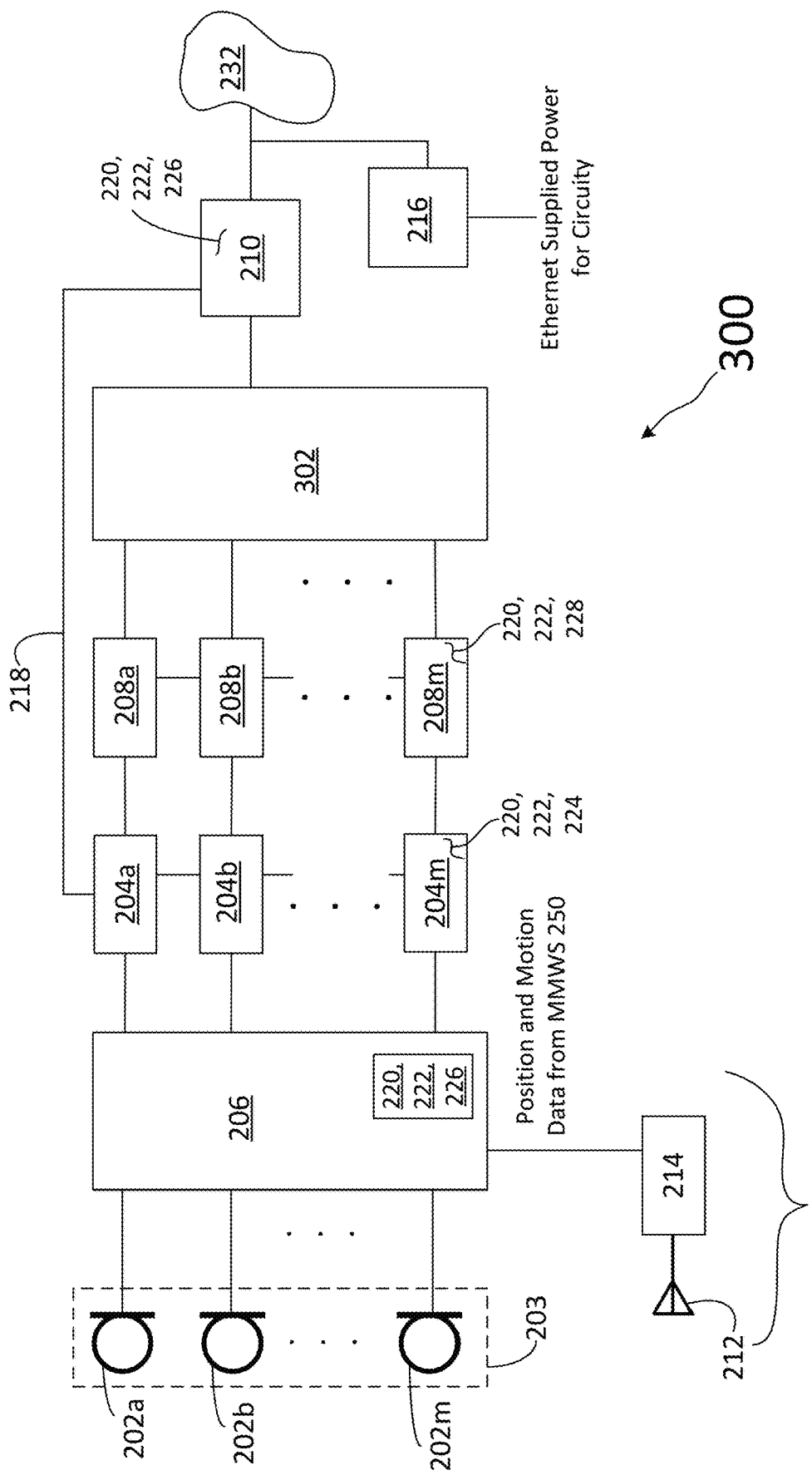
FIG. 3 illustrates a block diagram of an audio processing system characterized as using an adaptive beamformer with acoustic echo cancellation following beamforming for use with the room and conferencing system shown in FIGS. 1 and 4 that comprises an acoustic echo cancellation device (AECD), an adaptive beamforming circuit, active noise reduction circuitry, and a millimeter wave sensor, among other devices, according to aspects of the embodiments.
Figure 4:
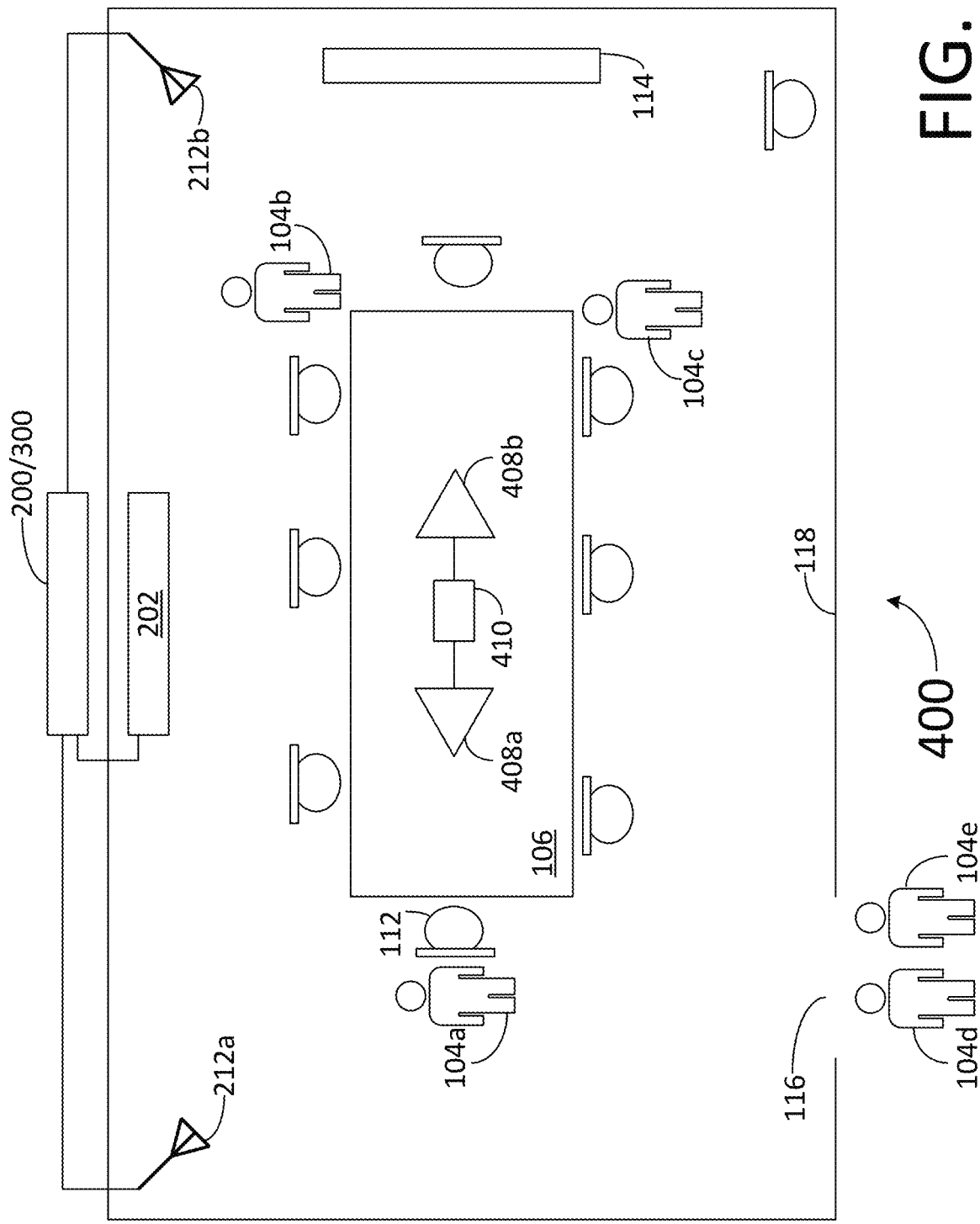
FIG. 4 illustrates a top view of a room substantially similar that of FIG. 1, but which can include the audio processing systems of FIGS. 2 and 3 according to aspects of the embodiments.

Also shown in FIGS. 2 and 3 is processor 220, memory 222, and the following software or applications (Apps): acoustic echo cancellation software/application (AEC App) 224, adaptive beamforming software/application (ABF App) 226, active noise reduction software/application (ANR App) 228, and conference system software/application (CS App) 230, as well as network 232. Apps 224, 226, 228, and 230 are stored in memory 224 associated with processors 222. Processors 222 and network 232 are described in greater detail below in regard to FIGS. 7 and 8, respectively. As those of skill in the art can now appreciate, each of AECD 204, adaptive beamformer circuitry 206, ANR circuit 208, and network interface (audio conference computer) 210 comprise processing devices and associated software. According to aspects of the embodiments, devices 204, 206, 208, and 210, each comprise one or more processors 220 and Apps 224, 226, 228, and 230; in regard to App 230, this can be embodied as a single, larger App, or can be implemented as separate modules or Apps 224, 226, and 228 in each of 204, 206, 208, and 210, respectively (as is shown in FIGS. 2 and 3). In AECD 204 App 224 and processor 222 perform the acoustic echo cancellation processing on the audio signals; in adaptive beamformer 206, App 226 and processor 222 perform the beamforming process on the received digital audio signals; in ANR circuit 208, App 228 and processor 222 perform active noise reduction; and in audio conference computer 210, processor 222 and App 230 perform the network interface processing. As those of skill in the art can further appreciate, the active noise reduction, beamforming, acoustic echo cancellation and network communications functions can all be performed by the separate devices as shown as well as by a single device, with one or more Apps 224, 226, 228, and 230. That is, substantially all of the processing can be performed in a single processing device, such as a laptop computer, desktop computer, cellphone, tablet, among other types of processing devices (e.g., 204, 206, 208, and 210 can all be one device, such as a laptop, or cell phone, with App 230 performing the processing as described herein).

While some embodiments will be described in the general context of program modules that execute in conjunction with an application program that runs on an operating system on a personal computer, or other processing devices, those skilled in the art will recognize that aspects may also be implemented in combination with other program modules.

Generally, program modules include routines, programs, components, data structures, and other types of structures that perform particular tasks or implement particular abstract data types. Moreover, those of skill in the art can appreciate that different aspects of the embodiments can be practiced with other computer system configurations, including handheld devices, multiprocessor systems, microprocessor-based or programmable consumer electronics, minicomputers, mainframe computers, and comparable computing devices. Aspects of the embodiments can also be practiced in distributed computing environments where tasks are performed by remote processing devices that are linked through a communications network. In a distributed computing environment, program modules can be located in both local and remote memory storage devices.

Aspects of the embodiments can be implemented as a computer-implemented process (method), a computing system, or as an article of manufacture, such as a computer program product or computer readable media. The computer program product can be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" can be a combination of software and hardware components for processing audio signals for beamforming and acoustic echo cancellation according to aspects of the embodiments. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory can be a removable or non-removable component of a computing device configured to store one or more instructions to be executed by one or more processors. A processor can be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience can be embodied as a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) can be a set of routines, protocols, and tools for an application or service that allow the application or service to interact or communicate with one or more other applications and services managed by separate entities.

Aspects of the embodiments address a need that arises from very large scale of operations created by networked computing and cloud-based services that cannot be managed by humans. The actions/operations described herein are not a mere use of a computer, but address results of a system that is a direct consequence of software used as a service such as communication services offered in conjunction with communications.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art can appreciate that aspects of the embodiments can be practiced with other computer system configurations, including hand-held devices, multiprocessor systems, microprocessor-based or programmable consumer electronics, minicomputers, mainframe computers, and comparable computing devices. Aspects of the embodiments can also be practiced in distributed computing environments where tasks are performed by remote processing devices that are linked through a communications network. In a distributed computing environment, program modules can be located in both local and remote memory storage devices.

Some aspects of the embodiments can be implemented as a computer-implemented process (method), a computing system, or as an article of manufacture, such as a computer program product or computer readable media. The computer program product can be a computer storage medium readable by a computer system and encoding a computer program that comprises instructions for causing a computer or computing system to perform example process(es). The computer-readable storage medium is a computer-readable memory device. The computer-readable storage medium can, for example, be implemented via one or more of a volatile computer memory, a non-volatile memory, a hard drive, a flash drive, a floppy disk, or a compact disk, and comparable hardware media, among other types of storage media.

A computing device, as used herein, refers to a device comprising at least a memory and one or more processors that includes a server, a desktop computer, a laptop computer, a tablet computer, a smart phone, a vehicle mount computer, or a wearable computer. A memory can be a removable or non-removable component of a computing device adapted to store one or more instructions to be executed by one or more processors. A processor can be a component of a computing device coupled to a memory and adapted to execute programs in conjunction with instructions stored by the memory. Actions or operations described herein can be executed on a single processor, on multiple processors (in a single machine or distributed over multiple machines), or on one or more cores of a multi-core processor. An operating system can be a system adapted to manage hardware and software components of a computing device that provides common services and applications. An integrated module can be a component of an application or service that can be integrated within the application or service such that the application or service can be adapted to execute the component. A computer-readable memory device can be a physical computer-readable storage medium implemented via one or more of a volatile computer memory, a non-volatile memory, a hard drive, a flash drive, a floppy disk, or a compact disk, and comparable hardware media that includes instructions thereon to substantially automatically save content to a location. A user experience can be a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input, among other types of inputs. An API can be a set of routines, protocols, and tools for an application or service that allow the application or service to interact or communicate with one or more other applications and services managed by separate entities.

Attention is directed to FIG. 3, which illustrates a block diagram of APS 300 using fixed beamforming, with beamforming before AEC, which can be described as using an adaptive beamformer 206 with AEC before beamforming for use with room 100. APS 300 comprises beamformer 206, AECDs 204a-m, ANR circuits 208a-m, N:1 auto mixer 302, and WSS 250, among other devices, according to aspects of the embodiments. According to aspects of the embodiments, use of WSS 250 generates position information to re-configure the beams in a fixed beamforming system. The generation and use of position information to reconfigure the beams does not necessarily require calculating direction of arrival or voice activity from the audio signals picked up by mic array 203. The reconfiguration of the previously fixed beams can be referred to as "beam adaption", which is a hybrid system that has multiple adapting beams. As those of skill in the art can appreciate, unlike traditional adaptive beamforming, the systems of FIGS. 2 and 3, APSs 200, 300 do not use direction of arrival or other audio information to adapt the beams, though according to further aspects of the embodiments, such functions can be implemented in the circuits of FIGS. 2 and 3.

Use of an acoustic echo canceler, by way of non-limiting example AECD 204, on each beam signal can also be used to remove far end signal from the mic signal; this is shown in FIG. 3, with reference line 218 carrying the far end audio signal from Ethernet interface 210 to each AECD 204a-m. According to still further aspects of the embodiments, the rate of beam adaption by beamformer 206 should be performed no faster than that which the echo canceller AECD 204 can adapt to; that is, the echo cancellation rate of AECD 204 and the beam formation rate of beamformer 206 are substantially equivalent. For example, if the adaption rate of the echo canceler is known, then the beam positioning should be changed slow enough so that the echo cancel filter adaption can keep up. According to still further aspects of the embodiments, noise reduction can then be used to remove extraneous noise such as that generated by air conditioning of heating systems (HVAC noise). Finally, according to still further aspects of the embodiments, an auto-mixer can combine the output of the multitude of beams to produce a single near-end speech signal to send to the far end.

In order of operation, APS 300 generates a plurality of beams (using data from WSS 250 according to aspects of the embodiments), as described above, each of which is processed by a respective AECD 204a-m, and then active noise reduction is performed by a respective ANR circuit 208a-m. The outputs of each of ANR circuits 208a-m are input to N:1 auto-mixer 302, which generates only one output signal to send to the far end via Ethernet interface 210.

The result of implementing WSS 250 in the beamforming system results in performance superior to that than a fully adaptive beamformer when multiple people 104 speak in room 100. A fully adaptive beamformer can produce only one signal so it would typically favor one person 104 speaking over another. This is not as natural sounding as the multi-beam approach.

According to still further aspects of the embodiments, combining mic array 203 and WSS 250 into a single POE powered network wall or ceiling mounted device can eliminate the need for other devices that are normally required in a modern home or office space. For example, WSS 250 can map all the devices or objects in room 100, as well as people 104, and detect their motion. Separate motion detectors, which are often used to control lights, adjust the room temperatures, and turn on/off A/V equipment, can be eliminated. Such implementations do not have to be stand alone devices, but can be combined into one apparatus, as the rate of data sampling by WSS 250 and data processing rates of other devices makes such multiple uses relatively straightforward. In addition, WSS 250 can be used to count the number of people 104 in room 100 that can then be reported to a cloud-based management system, such as Crestron's XiO Cloud, to track room utilization. By tracking the number of people 104 in meetings spaces 100, companies can optimize future space planning.

According to still further aspects of the embodiments, WSS 250 can be used to recognize hand and arm movement gestures due to its high resolution. In recognizing gestures, WSS 250 can be used to control various aspects of the AV system, among other devices. By way of non-limiting example, raising an arm can be recognized as a request to increase the volume of audio or increase the intensity of lights; or, a sideways swipe of the arm and hand can be used to inform a computer to advance a Power Point slide. According to still further aspects of the embodiments, gesture control can be limited to a person 104 seated at the head of table 106, so that arbitrary hand motions by untrained people sitting at conference table 106 do not cause unexpected behavior. Or, according to still further aspects of the embodiments, a specific hand or arm motion can first be performed in order for WSS 250 to interpret subsequent gesture controls; in this manner, control of one or more devices can be handed off from one person 104a to the next person 104b, regardless of position in room 100.

According to still further aspects of the embodiments, additional antennas 212 and/or multiple MWSs 250 can be added to increase the capabilities of both APS 200, 300 (note that FIG. 4 illustrates an implementation of two antennas 212). The incremental cost is small since much of the cost is in the microprocessor, audio DSP, power supplies and enclosure. According to further aspects of the embodiments, the implementations of APSs 200, 300 can be embodied in as few as a couple of different devices, or, as is shown in each of the Figures, different devices for different functionalities. According to still further aspects of the embodiments, additional sensors can be added such as light, temperature, and humidity sensors, among others. Such an integrated system can provide control over lighting (lights, shades, curtain), HVAC settings, as well as video and audio applications, by using the determination of the presence and/or motion of the occupants using MWSs 125.

Figure 5:
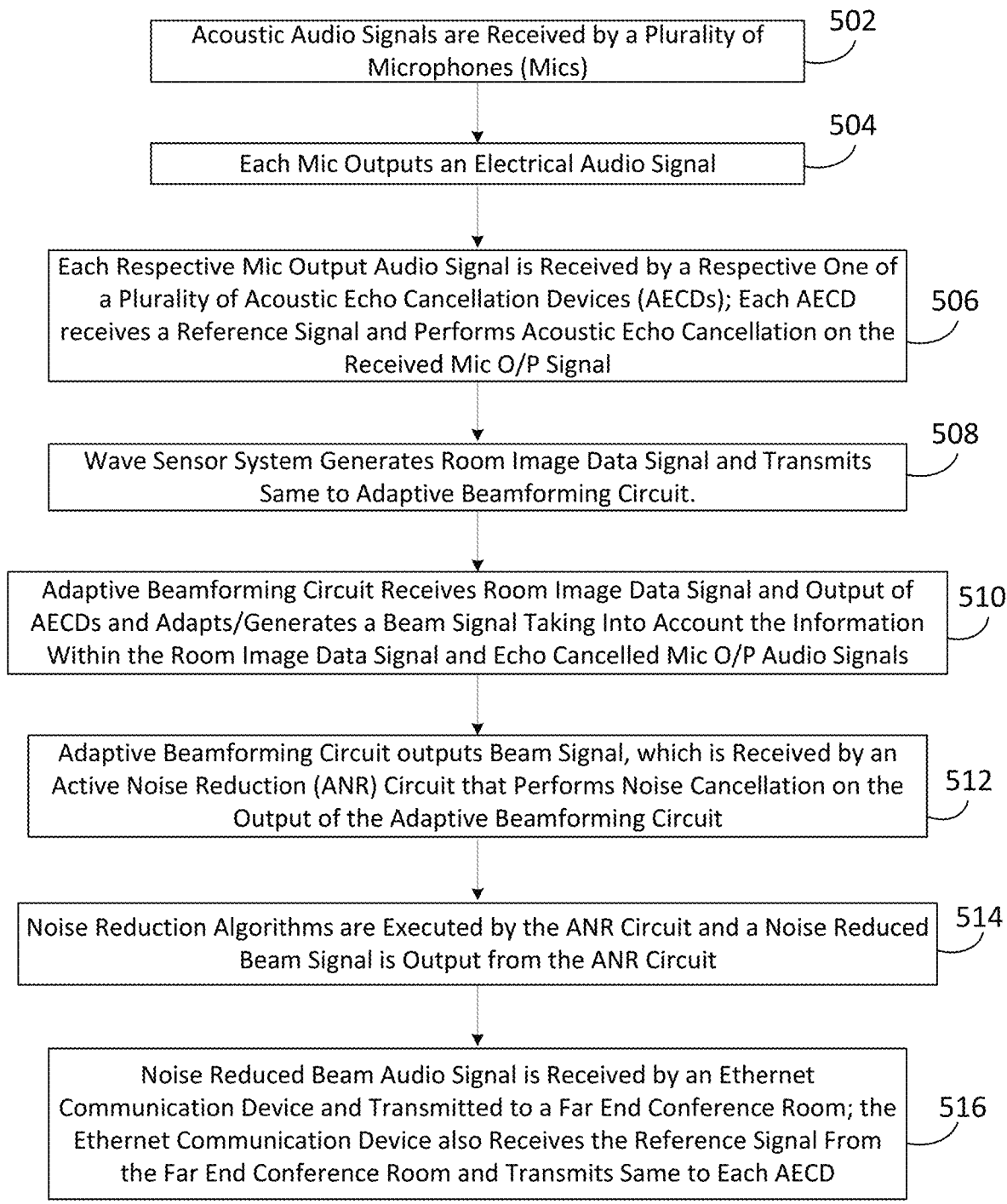
FIG. 5 illustrates a flow chart of a method for operating a beamforming microphone array in a conference room in which a plurality of microphones output audio signals to an equal plurality of acoustic echo cancellation devices that provide a plurality of echo cancelled audio signals to an adaptive beamforming device that receives as an input a room image signal to facilitate generation of an audio beam signal the subject to active noise reduction prior to be sent to a far end conference room according to aspects of the embodiments.

FIG. 5 illustrates a flow chart of method 500 for operating audio processing system 200 as shown in FIG. 2, in a conference room in which a plurality of microphones 202 output audio signals to an equal plurality of acoustic echo cancellation devices 204 that provide a plurality of echo cancelled audio signals to an adaptive beamforming device 206 that receives as an input a room image signal (from WSS 250) to facilitate generation of an audio beam signal subject to active noise reduction in ANR circuit 208 prior to be sent to a far end conference room by NW I/F 210 according to aspects of the embodiments. The room image signal generated by WSS 250 can include two or three dimensional room data, i.e., a layout of the room, or area within which audio processing system 300 is located, and/or information about locations of one or more people (users) in the room or area within which audio processing system is located.

Attention is directed to FIG. 5 and method 500, which begins with method step 502. In method step 502 acoustic audio signals are received by mics 202a-n. In method step 504 mics 202 output electrical audio signals to an equal plurality of AECDs 204a-n (method step 506). The output electrical audio signals can be analog signals, but typically are digital, wherein mics 202 include analog-to-digital converters.

In method step 506 each AECD 204 performs acoustic echo cancellation on the received mic audio signals using algorithms and processing that also incorporate reference signal 218 that has been received from a far end conference room (not shown) by NW I/F 210. In method step 508, the output of WSS 250 is received by adaptive beamforming circuit 206 wherein a single audio beam is generated or adapted taking into account the information contained in the room image data signal generated by WSS 250 (method step 510). In method step 512 the single audio beam generated or adapted by adaptive beam forming circuit 206 is transmitted to ANR circuit 208, and in method step 514 noise cancellation processing is performed on the audio beam signal output by adaptive beamforming circuit 206. In method step 516, the noise reduced audio signal is transmitted by ANR circuit 208 to NW I/F 210, where it is then transmitted to the far end conference room as a near end audio signal.

Figure 6:
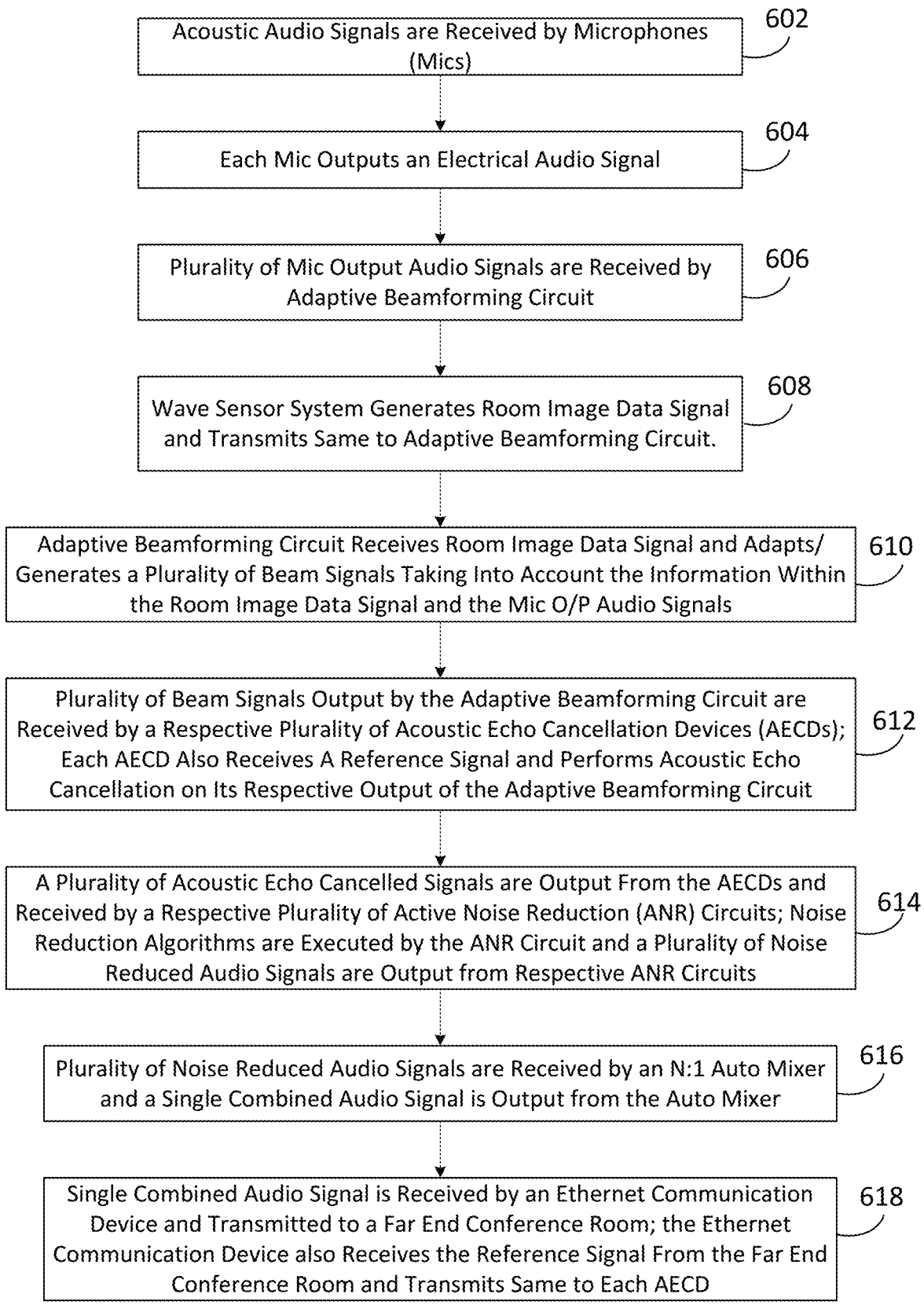
FIG. 6 illustrates a flow chart of a method for operating a beamforming microphone array in a conference room in which a plurality of microphones output audio signals to an adaptive beamforming device that receives as an input a room image signal to facilitate generation of a plurality of audio beam signals that are then processed individually by acoustic echo cancellation devices and active noise reductions circuity prior to being auto-mixed and sent to a far end conference room according to aspects of the embodiments.

FIG. 6 illustrates a flow chart of method 600 for operating audio processing system 300 as shown in FIG. 3, in a conference room in which a plurality of microphones 202 output audio signals to adaptive beamforming device 206 that also receives as an input a room image signal from WSS 250 to facilitate generation of a plurality of audio beam signals that are then processed individually by AEDs 204 and ANR circuits 208 prior to being auto-mixed by auto mixer 302 and sent to a far end conference room by NW I/F 210 according to aspects of the embodiments. The room image signal generated by WSS 250 can include two or three dimensional room data, i.e., a layout of the room, or area within which audio processing system 300 is located, and/or information about locations of one or more people (users) in the room or area within which audio processing system is located.

Attention is directed to FIG. 6 and method 600, which begins with method step 602. In method step 602 acoustic audio signals are received by mics 202a-m. The output electrical audio signals can be analog signals, but typically are digital, wherein mics 202a-m include analog-to-digital converters. In method step 604 each of mics 202a-m transmits its respective electrical mic output audio signal, which are then received by adaptive beamforming circuit 206 in method step 606.

In method step 608 WSS 250 generates the room image data signal and transmits the same to adaptive beamforming circuit 206. In method step 610 adaptive beamforming circuit 206 receives the room image data signal and generates or adapts a plurality of audio beam signals taking into account the information contained in the room image data signal generated by WSS 250 and the received mic audio signals.

In method step 612, adaptive beamforming circuit 206 outputs the plurality of audio beam signals generated in method step 610 to an equal plurality of AECDs 204a-m. Also, in method step 612, each AECD 204a-m also receives the reference signal 218 from NW I/F 210, which is the far end conference room audio signal that is also output to one or more speakers (not shown) in the conference room. Echo cancellation is performed on each audio beam signal taking into account the reference signal.

In method step 614, a plurality of acoustic echo cancelled signals are output from the respective plurality of AECDs 204a-m and transmitted to a respective plurality of ANR circuits 208a-m. Each ANR circuit 208a-m then performs noise reduction processing on the received acoustic echo cancelled signals, and a plurality of noise reduced audio signals are then output from respective ANR circuits 208a-m.

In method step 616, the plurality of noise reduced audio signals are received by an N:1 auto mixer that combines the received signals and outputs a single combined audio output signal. In method step 618, the single combined audio output signal is received by NW I/F 210 and transmitted to the far end conference room.

Figure 7:
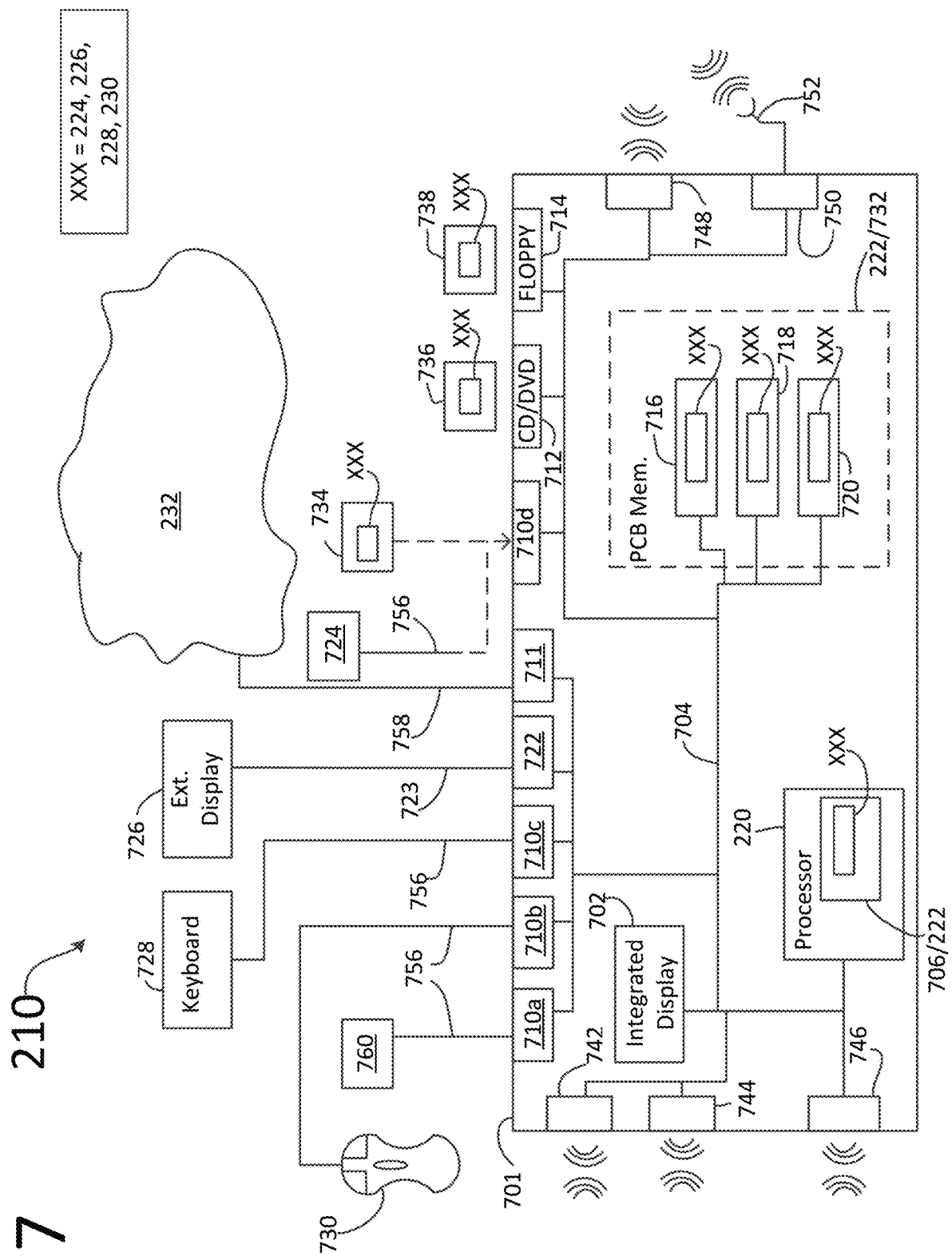
FIG. 7 illustrates a personal computer/processor/laptop suitable for use to implement the methods shown in FIGS. 5 and 6, among other methods, for optimizing adaptive beamforming according to aspects of the embodiments.

FIG. 7 illustrates a personal computer/processor/laptop suitable for use to implement the methods shown in FIGS. 5 and 6, among other methods, for optimizing adaptive beamforming according to aspects of the embodiments.

FIG. 7 illustrates a block diagram of NW I/F or audio conference computer 210 ((from hereon in, NW I/F 210) and other types of computers, such as laptops, desktops, tablets, personal digital assistants (PDAs) and the like) suitable for use to implement methods 500 and 600 for performing adaptive beamforming according to aspects of the embodiments. NW I/F 210 comprises, among other items, shell/box 701, integrated display/touch-screen (display) 702 (though not used in every application of NW I/F 210), internal data/command bus (bus) 704, processor board/processor internal memory (internal memory) 732, and one or more processors 124 with processor internal memory 706 (which can be typically read only memory (ROM) and/or random access memory (RAM)). Those of ordinary skill in the art can appreciate that in modern processor systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application. NW I/F 210 further comprises multiple input/output ports, such as universal serial bus ports 710, Ethernet ports 711, and video graphics array (VGA) ports/high definition multimedia interface (HDMI) ports 722, among other types. Further, NW I/F 210 includes externally accessible drives such as compact disk (CD)/digital video disk (DVD) read/write (RW) (CD/DVD/RW) drive 712, and floppy diskette drive 714 (though less used currently, many computers still include this device). NW I/F 210 still further includes wireless communication apparatus, such as one or more of the following: Wi-Fi transceiver 742, BlueTooth (BT) transceiver 744, near field communications (NFC) transceiver 746, third generation (3G)/fourth Generation (4G)/long term evolution (LTE) (3G/4G/LTE) transceiver 748, communications satellite/global positioning system (satellite) transceiver device 750, and antenna 752.

Internal memory 732 itself can comprise hard disk drive (HDD) 716 (these can include conventional magnetic storage media, but, as is becoming increasingly more prevalent, can include flash drive memory 734, among other types), read-only memory (ROM) 718 (these can include electrically erasable (EE) programmable ROM (EEPROMs), ultraviolet erasable PROMs (UVPROMs), among other types), and random access memory (RAM) 720. Usable with USB port 710 is flash drive memory 734, and usable with CD/DVD/RW drive 712 are CD/DVD disks 736 (which can be both read and write-able). Usable with floppy diskette drive 714 are floppy diskettes 738. External memory storage 724 can be used to store data and programs external to box 701 of audio conference computer 120, and can itself comprise another HDD 716a, flash drive memory 734 (which can also be referred to as "storage media"), among other types of memory storage. External memory storage 724 is connectable to NW I/F 210 via USB cable 756. Each of the memory storage devices, or the memory storage media (706, 716, 718, 720, 724, 734, 736, and 738, among others), can contain parts or components, or in its entirety, executable software programming code or application (application, or "App") Apps 224, 226, 228, and 230, which can implement part or all of the portions of methods 500 and 600 described herein. In FIG. 7, Apps 224, 226, 228, and 230 have been represented by the designation "XXX."

In addition to the above described components, NW I/F 210 also comprises keyboard 728, external display 726, printer/scanner/fax machine 760, and mouse 730 (although not technically part of processor 124, the peripheral components as shown in FIG. 7 (724, 726, 728, 730, 734, 736, 738, and 760) are so well known and adapted for use with NW I/F 210 that for purposes of this discussion they shall be considered as being part of audio conference computer 120). Other cable types that can be used with NW I/F 210 include RS 232, among others, not shown, that can be used for one or more of the connections between NW I/F 210 and the peripheral components described herein. Keyboard 728, mouse 730, and printer/scanner/fax machine 760 are connectable to NW I/F 210 via USB cable 756 and USB ports 710, and external display 726 is connectible to computer 120 via VGA cable/HDMI cable 723. NW I/F 210 is connectible to network 122 (which can be the Internet) via Ethernet port 77 and Ethernet cable 758 via a router and modulator-demodulator (MODEM), neither of which are shown in FIG. 7. All of the immediately aforementioned components (722, 724, 726, 728, 730, 734, 736, 738, 756, 758, and 760) are known to those of ordinary skill in the art, and this description includes all known and future variants of these types of devices.

External display 726 can be any type of known display or presentation screen, such as liquid crystal displays (LCDs), light emitting diode displays (LEDs), plasma displays, cathode ray tubes (CRTs), among others. In addition to the user interface mechanism such as mouse 730, NW I/F 210 can further include a microphone, touch pad, joy stick, touch screen, voice-recognition system, among other inter-active inter-communicative devices/programs, which can be used to enter data and voice, and which all of are known to those of skill in the art and thus a detailed discussion thereof has been omitted in fulfillment of the dual purposes of clarity and brevity.

As mentioned above, NW I/F 210 further comprises a plurality of wireless transceiver devices, such as Wi-Fi transceiver 742, BT transceiver 744, NFC transceiver 746, 3G/4G/LTE transceiver 748, satellite transceiver device 750, and antenna 752. While each of Wi-Fi transceiver 742, BT transceiver 744, NFC transceiver 746, 3G/4G/LTE transceiver 748, and satellite transceiver device 750 has their own specialized functions, each can also be used for other types of communications, such as accessing a cellular service provider (not shown), accessing the Internet, texting, emailing, among other types communications and data/voice transfers/exchanges, as known to those of skill in the art. Each of Wi-Fi transceiver 742, BT transceiver 744, NFC transceiver 746, 3G/4G/LTE transceiver 748, satellite transceiver device 750 includes a transmitting and receiving device, and a specialized antenna, although in some instances, one antenna can be shared by one or more of Wi-Fi transceiver 742, BT transceiver 744, NFC transceiver 746, 3G/4G/LTE transceiver 748, and satellite transceiver device 750. Alternatively, one or more of Wi-Fi transceiver 742, BT transceiver 744, NFC transceiver 746, 3G/4G/LTE transceiver 748, and satellite transceiver device 750 will have a specialized antenna, such as satellite transceiver device 750 to which is electrically connected at least one antenna 752.

In addition, NW I/F 210 can access network 122, either through a hard-wired connection such as Ethernet port 77 as described above, or wirelessly via Wi-Fi transceiver 742, 3G/4G/LTE transceiver 748 and/or satellite transceiver 750 (and their respective antennas) according to aspects of the embodiments. NW I/F 210 can also be part of a larger network configuration as in a global area network (GAN) (e.g., the internet), which ultimately allows connection to various landlines.

According to further aspects of the embodiments, integrated touch screen display 702, keyboard 728, mouse 730, and external display 726 (if in the form of a touch screen), can provide a means for a user to enter commands, data, digital, and analog information into audio conference computer 120. Integrated and external displays 702, 726 can be used to show visual representations of acquired data, and the status of applications that can be running, among other things.

Bus 704 provides a data/command pathway for items such as: the transfer and storage of data/commands between audio conference computer 120, Wi-Fi transceiver 742, BT transceiver 744, NFC transceiver 746, 3G/4G/LTE transceiver 748, satellite transceiver device 750, integrated display 702, USB port 710, Ethernet port 77, VGA/HDMI port 722, CD/DVD/RW drive 712, floppy diskette drive 714, and internal memory 732. Through bus 704, data can be accessed that is stored in internal memory 732. NW I/F 210 can send information for visual display to either or both of integrated and external displays 702, 726, and the user can send commands to system operating programs/software/Apps (including Apps 224, 226, 228, and 230) that might reside in processor internal memory 706 of audio conference computer 120, or any of the other memory devices (736, 738, 716, 718, and 720).

NW I/F 210 and either processor internal memory 706 or internal memory 732, can be used to implement methods 500 and 600, among others, for performing adaptive beamforming according to aspects of the embodiments. Hardware, firmware, software or a combination thereof may be used to perform the various steps and operations described herein. According to aspects of the embodiments, one or more of Apps 224, 226, 228, and 230 for carrying out the above discussed steps can be stored and distributed on multi-media storage devices such as devices 716, 718, 720, 734, 736 and/or 738 (described above) or other form of media capable of portably storing information. Storage media 734, 736 and/or 738 can be inserted into, and read by devices such as USB port 710, CD/DVD/RW drive 712, and disk drives 714, respectively.

As also will be appreciated by one skilled in the art, the various functional aspects of the embodiments may be embodied in a wireless communication device, a telecommunication network, or as one or more methods (500, 600, among others) or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random-access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

Figure 8:
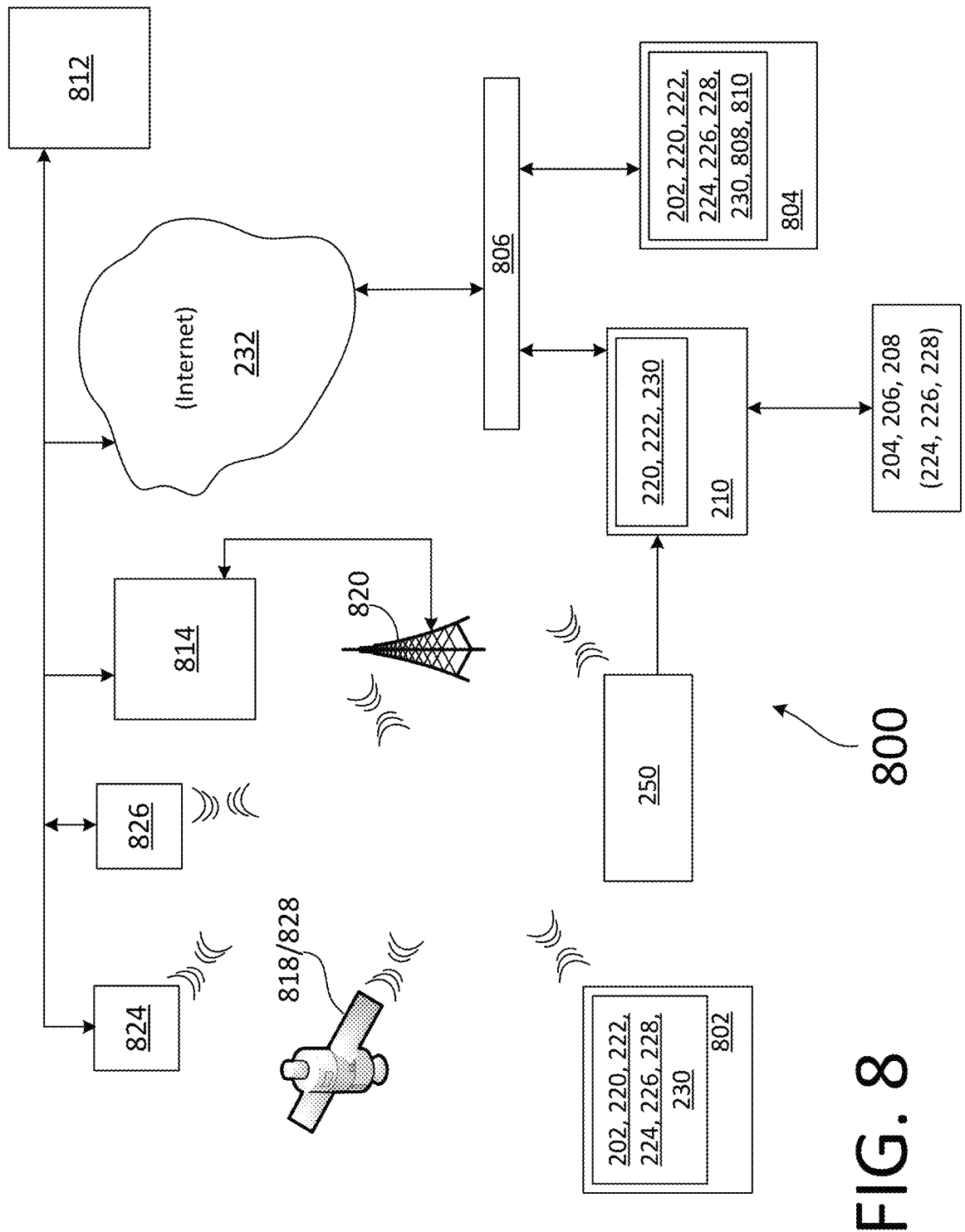
FIG. 8 illustrates a network system within which the systems and methods shown in FIGS. 1-6 can operate for optimizing adaptive beamforming according to aspects of the embodiments.

FIG. 8 illustrates network system 800 within which the systems and methods shown in FIGS. 1-6 can operate for optimizing adaptive beamforming according to aspects of the embodiments. Much of the network system infrastructure shown in FIG. 8 is or should be known to those of skill in the art, so, in fulfillment of the dual purposes of clarity and brevity, a detailed discussion thereof shall be omitted.

According to aspects of the embodiments, a user of the systems (200, 300, among others) and methods (500, 600, among others) for performing adaptive beamforming can have Apps 224, 226, 228 and 230 on their mobile device (or cell phone) 802, as well as on NW I/F 210, laptop computer, server, tablet device, and/or dedicated devices 204, 206, 208 and 210, such as those shown in FIGS. 2 and 3, and the systems shown in the remaining Figures, according to aspects of the embodiments. Thus, each of devices 802, 204, 206, 208, and 210 contain processor 220 and one form or another of Apps 224, 226, 228, and 230 according to aspects of the embodiments. According to aspects of the embodiments, cell phone 802 can include two or more mics 202 or two or more external mics 202 can be connected via a wired or wired interface. According to further aspects of the embodiments, two or more cell phones 802, each with a single mic 202, or one cell phone 802 with two mics 202 (either internally connected or externally connected), with or without external speakers, can operate all of Apps 224, 226, 228 and 230 and perform one or more both of methods 500 and 600, among others, as discussed herein. The Apps 224, 226, 228 and 230 can be integrated into one or more applications that can be downloaded or previously stored onto cell phone 802 such that cell phone 802, or two or more of them, can operate as an audio conferencing system with one or more of adaptive beamforming, active noise reductions, acoustic echo cancellation and the networking capabilities. According to further aspects of the embodiments, several cell phones 802a-n can operate the above described Apps 224, 226, 228 and 230 so that the performance of the system is improved. According to still further aspects of the embodiments, wave sensor system 250 can be connected to the one or more cell phones 802 via a wired or wireless connection, as shown in FIG. 8.

Mobile devices 802 can include, but are not limited to, so-called smart phones, tablets, personal digital assistants, notebook and laptop computers, and essentially any device that can access the internet and/or cellular phone service or can facilitate transfer of the same type of data in either a wired or wireless manner. For purposes of this discussion, the user shall be discussed as using only mobile device 802, i.e., a smartphone, though such discussion should be understand to be in a non-limiting manner in view of the discussion above about the other types of devices that can access, use, and provide such information.

Mobile device 802 can access cellular service provider 814, either through a wireless connection (cellular tower 820) or via a wireless/wired interconnection (a "Wi-Fi" system that comprises, e.g., modulator/demodulator (modem) 808, wireless router 810, personal computer (PC) 804, internet service provider (ISP) 806, and network 122). Further, mobile device 802 can include near field communication (NFC), "Wi-Fi," and Bluetooth (BT) communications capabilities as well, all of which are known to those of skill in the art. To that end, network system 800 further includes, as many homes (and businesses) do, one or more PCs/servers 804 that can be connected to wireless router 810 via a wired connection (e.g., modem 808) or via a wireless connection (e.g., Bluetooth). Modem 808 can be connected to ISP 806 to provide internet-based communications in the appropriate format to end users (e.g., PC 804), and which takes signals from the end users and forwards them to ISP 806. Such communication pathways are well known and understand by those of skill in the art, and a further detailed discussion thereof is therefore unnecessary.

Mobile device 802 can also access global positioning system (GPS) satellite 828, which is controlled by GPS station 824, to obtain positioning information (which can be useful for different aspects of the embodiments), or mobile device 802 can obtain positioning information via cellular service provider 814 using cell tower(s) 820 according to one or more well-known methods of position determination. Some mobile devices 802 can also access communication satellites 818 and their respective satellite communication systems control stations 826 (the satellite in FIG. 8 is shown common to both communications and GPS functions) for near-universal communications capabilities, albeit at a much higher cost than convention "terrestrial" cellular services. Mobile device 802 can also obtain positioning information when near or internal to a building (or arena/stadium) through the use of one or more of NFC/BT devices, the details of which are known to those of skill in the art. FIG. 8 also illustrates other components of network system 800 such as plain old telephone service (POTS) provider 812

(though shown to be connected to network 122 (which can be the Internet), connections have been omitted for clarity to devices 120 and 804).

According to further aspects of the embodiments, network system 800 also contains NW I/F 210, wherein one or more processors 220, using known and understood technology, such as memory, data and instruction buses, and other electronic devices, can store and implement code that can implement the systems (200, 300, among others) and methods (500, 600 among others) for performing adaptive beamforming according to aspects of the embodiments.

The disclosed embodiments provide several different systems, software products, and methods generally related to audio systems and digital signal processing, and more particularly to systems, methods, and modes for implementing a millimeter wave sensor to optimize operation of a beamforming microphone array, among other types of systems. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

INDUSTRIAL APPLICABILITY

To solve the aforementioned problems, the aspects of the embodiments are directed towards systems, methods, and modes for audio systems, and more specifically to systems, methods, and modes for implementing a millimeter wave sensor to optimize operation of a beamforming microphone array, as well as other home or enterprise systems.

Alternate Embodiments

Alternate embodiments may be devised without departing from the spirit or the scope of the different aspects of the embodiments.

The invention claimed is:

1. A beamforming microphone array comprising:
   a plurality of microphones each of which is adapted to receive an acoustic audio signal and convert the same to a microphone (mic) audio signal;
   a wave sensor system adapted to determine locations of one or more people within a predetermined area about the beamforming microphone array and output the same as user location data signal; and
   an adaptive beamforming circuit adapted to receive the user location data signal and plurality of mic audio signals and perform adaptive beamforming on the plurality of mic audio signals that takes into account the received user location data signal to adapt a plurality of beam signals, one for each of the microphones, to acquire sound from one or more specific locations in the predetermined area; and
   a plurality of acoustic echo cancellation devices, one for each of the beam signal outputs from the adaptive beamforming circuit, wherein each of the plurality of acoustic echo cancellation devices is adapted to receive a respective beam signal from the adaptive beamforming circuit and perform acoustic echo cancellation on the received respective beam signal and output the echo-corrected beam signal, and wherein
      the predetermined area is a conference room, and
      if the user location data signal indicates that there are more people than beams that can be formed, then the adaptive beamforming circuit is further adapted to modify one or more of the fixed beam positions to cover two or more people in the conference room such that each person is covered by at least one fixed beam, and further wherein,
      the adaptive beamforming circuit is adapted to adjust a beam width and shape to cover two or more people in the conference room.

2. The beamforming microphone array according to claim 1, wherein the wave sensor system comprises:
   a millimeter (mm) wave transmitter; and
   a wave receiver.

3. The beamforming microphone array according to claim 1, wherein the wave sensor system comprises:
   an optical transmitter; and
   an optical receiver.

4. The beamforming microphone array according to claim 1, wherein
   the wave sensor system is further adapted to generate a three dimensional image of the predetermined area and output the same as an area image data signal.

5. The beamforming microphone array according to claim 4 wherein
   the adaptive beamforming circuit is further adapted to receive the area image data signal and the plurality of mic audio signals and perform adaptive beamforming on the plurality of mic audio signals that takes into account the received area image data signal to adapt one or more beams to acquire sound from one or more specific locations in the predetermined area.

6. The beamforming microphone array according to claim 5, wherein
   the adaptive beamforming circuit is adapted to modify the beam audio signals to reduce noise reflected off one or more objects within the predetermined area based on the area image data signal.

7. The beamforming microphone array according to claim 4, wherein the area image data signal comprises:
  information as to where motion is occurring within the predetermined area.

8. The beamforming microphone array according to claim 7, wherein
  the information contained within the area image data signal that motion is occurring within the predetermined area substantially eliminates objects from the area image data signal that are substantially at rest.

9. The beamforming microphone array according to claim 7, wherein
  the information contained within the area image data signal that motion is occurring within the predetermined area does not include objects that move with a substantially constant velocity.

10. The beamforming microphone array according to claim 9, wherein
  the object that moves with a substantially constant periodicity comprises a fan.

11. The beamforming microphone array according to claim 4, wherein the area image data signal comprises:
  distance information between the wave sensor system and objects within the predetermined area.

12. The beamforming microphone array according to claim 11, wherein
  the objects comprise one or more of a floor, table, walls, and other furniture.

13. The beamforming microphone array according to claim 11, wherein
  the adaptive beamforming circuit is further adapted to adapt one or more beams that takes into account the distance information generated by the wave sensor system.

14. The beamforming microphone array according to claim 13, wherein
  the adaptive beamforming circuit is adapted to modify one or more of a beam width, beam reception angle, and range of the beam based on the received distance information generated by the wave sensor system.

15. The beamforming microphone array according to claim 4, wherein
  the adaptive beamforming circuit is further adapted to receive the area image data signal, the user location data signal, and the plurality of mic audio signals, and perform adaptive beamforming on the plurality of mic audio signals that takes into account the information in the area image data signal and the user location data signal, such that
  the adaptive beamforming circuit is further adapted to substantially ignore voice signals that originate from outside the areas where the users are located.

16. The beamforming microphone array according to claim 4, wherein
  the adaptive beamforming circuit is further adapted to receive the area image data signal, the user location data signal, and the plurality of mic audio signals, and perform adaptive beamforming on the plurality of mic audio signals that takes into account the information in the area image data signal and the user location data signal, such that
  the adaptive beamforming circuit is further adapted to substantially ignore audio signals generated from one or more of a television and stereo.

17. The beamforming microphone array according to claim 4, wherein
  the predetermined area is a conference room,
  there is at least one table located in the conference room, and further wherein
  the area image data signal includes information as to a location of the at least one table in the conference room, and further wherein
  the adaptive beamforming circuit is adapted to adapt one or more fixed beam positions covering a perimeter of the at least one table in the conference room.

18. The beamforming microphone array according to claim 4, wherein the adaptive beamforming circuit comprises:
  an acoustic audio direction of arrival algorithm adapted to determine direction of arrival of one or more microphone generated audio signals.

19. The beamforming microphone array according to claim 18, wherein
  the direction of arrival algorithm is adapted to determine a direction of arrival of the one or more microphone generated audio signals using information in the area image data signal received from the wave sensor system.

20. The beamforming microphone array according to claim 4, wherein
  the wave sensor system can determine motion of one or more objects located in the predetermined area.

21. The beamforming microphone array according to claim 20, wherein
  the wave sensor system can include the object motion information about the predetermined area in the area image data signal, and wherein
  the adaptive beamforming circuit can eliminate fixed objects and objects moving at a substantially constant rate from the area image data signal to determine a number of people located in the predetermined area, and output the same as a room occupancy status.

22. The beamforming microphone array according to claim 21, wherein
  the room occupancy status can be used by other interconnected systems to control one or more of lights, temperature, and audio-video equipment in the conference room.

23. The beamforming microphone array according to claim 21, wherein
  the room occupancy status can be transmitted to a room monitoring system.

24. The beamforming microphone array according to claim 1, wherein the predetermined area comprises:
  a conference room.

25. The beamforming microphone array according to claim 1, wherein
  the adaptive beamforming circuit is further adapted to generate one or more beams to acquire sound from one or more specific locations in the predetermined area.

26. The beamforming microphone array according to claim 1, wherein
  the adaptive beamforming circuit is adapted to generate new beams no faster than a first beam formation rate, and wherein
  the acoustic echo cancellation device is adapted to perform echo cancellation no faster than a first echo cancellation rate, and still further wherein
  the first echo cancellation rate and the first beam formation rate are substantially equivalent.

27. The beamforming microphone array according to claim 1, wherein
the wave sensor system is adapted to resolve distances within the predetermined area within about 1 mm and within about 1 degree.

28. The beamforming microphone array according to claim 1, wherein
the predetermined area is a conference room, and
the adaptive beamforming circuit is adapted to extract location information for each person in the conference room and generate a respective fixed beam position for each person in the conference room.

29. The beamforming microphone array according to claim 1, wherein the adaptive beamforming circuit further comprises:
a plurality of active noise reduction circuits, one for each acoustic echo cancellation device, and wherein each of the active noise reduction circuits is adapted to remove noise from an output of its respective acoustic echo cancellation device and output a noise reduced audio signal;
an auto-mixer device adapted to receive the plurality of noise reduced audio signals from the plurality of active noise reductions circuits and combine the plurality of noise reduced audio signals to output a single near end audio signal; and
an Ethernet communication device adapted to receive a reference signal from a remote source, output the same to one or more speakers in the predetermined area, and forward the same to each of the one or more acoustic echo cancellation devices, and wherein
each of the one or more acoustic echo cancellation devices is adapted to delete the reference signal from a respective one of the microphone audio signals received by the respective acoustic echo cancellation devices; and
a power-over-Ethernet device adapted to extract electrical power over Ethernet communications cables and provide the electrical power to the circuits in the beamforming array.

30. The beamforming microphone array according to claim 29, wherein
the reference signal comprises a far end audio signal.

31. The beamforming microphone array according to claim 29, further comprising:
one or more of each of light sensors, temperature sensors, and humidity sensors, and wherein
the beamforming microphone array is adapted to receive as inputs outputs from each of the sensors, and output the sensor outputs through the Ethernet communication device.

32. The beamforming microphone array according to claim 1, wherein
the wave sensor system is adapted to recognize gestures including one or more of hand motion and arm motion.

33. The beamforming microphone array according to claim 32, wherein
the recognized gestures can control one or more functions in the conference room, and wherein
the functions include one or more of lighting levels, audio levels, temperature levels, humidity levels, and positions of shades and/or curtains.

* * * * *